(12) United States Patent
Kanno et al.

(10) Patent No.: US 8,892,361 B2
(45) Date of Patent: Nov. 18, 2014

(54) ROUTE CALCULATION APPARATUS

(75) Inventors: Yasunori Kanno, Obu (JP); Masamiki Andoh, Nagoya (JP); Hiroyuki Hirano, Anjo (JP); Hiroki Ukai, Nagoya (JP)

(73) Assignee: Denso Corporation, Kariya (JP)

( * ) Notice: Subject to any disclaimer, the term of this patent is extended or adjusted under 35 U.S.C. 154(b) by 56 days.

(21) Appl. No.: 13/470,399

(22) Filed: May 14, 2012

(65) Prior Publication Data
US 2012/0310520 A1 Dec. 6, 2012

(30) Foreign Application Priority Data
Jun. 6, 2011 (JP) ................................ 2011-126450

(51) Int. Cl.
*G01C 21/34* (2006.01)
(52) U.S. Cl.
CPC .................. *G01C 21/3423* (2013.01)
USPC ......................................................... 701/483
(58) Field of Classification Search
CPC .......... G01C 21/3423; G01C 21/3688
USPC ........................................................ 701/483
See application file for complete search history.

(56) References Cited

U.S. PATENT DOCUMENTS

| 6,421,606 | B1 | 7/2002 | Asai et al. | |
| 2003/0069686 | A1* | 4/2003 | Watanabe et al. | 701/200 |
| 2004/0204840 | A1* | 10/2004 | Hashima et al. | 701/209 |

OTHER PUBLICATIONS

Office Action dated Jul. 14, 2014 issued in corresponding CN patent application No. 201210182733.2 (and English translation).

* cited by examiner

*Primary Examiner* — Calvin Cheung
*Assistant Examiner* — Basil T Jos
(74) *Attorney, Agent, or Firm* — Posz Law Group, PLC

(57) ABSTRACT

An information center calculates, from a specific departure point to a specific destination, (i) an optimal route for an in-vehicle terminal when a request terminal of a route search request is the in-vehicle terminal and (ii) an optimal route for a mobile terminal when the request terminal of the route search request is the mobile terminal, respectively. The calculated optimal route for the in-vehicle terminal is different from the calculated optimal route for the mobile terminal.

17 Claims, 14 Drawing Sheets

ROUTE CALCULATION APPARATUS

CROSS REFERENCE TO RELATED APPLICATION

This application is based on Japanese Patent Application No. 2011-126450 filed on Jun. 6, 2011, the disclosure of which is incorporated herein by reference.

TECHNICAL FIELD

The present disclosure relates to a route calculation apparatus, which searches for and calculates an optimal route using public transportation and a vehicle other than a public vehicle that belongs to the public transportation.

BACKGROUND

[Patent document 1] JP 2001-124569 A

Conventionally, as disclosed in the patent document 1, a route calculation apparatus is known for searching for and calculating a route from a departure point to a destination using public transportation (i.e., railway trains and buses) and a vehicle other than a public vehicle that belongs to the public transportation. Searching for a route using multiple modes of transportation is referred to as multimodal route search.

SUMMARY

It is an object of the present disclosure to provide a route calculation apparatus, in which convenience of route search is increased by changing a route search method of a route according to a type of a terminal on which the route is displayed.

To achieve the above object, according to an aspect of the present disclosure, a route calculation apparatus is provided as follows. The route calculation apparatus includes a route search section, and a terminal determination section. The route search section searches for and calculates an optimal route from a departure point to a destination using a public transportation and a vehicle other than a public vehicle that belongs to the public transportation. The terminal determination section determines a display terminal of the optimal route calculated by the route search section. The terminal determination section determines whether the display terminal is an in-vehicle terminal, which is non-portable from the vehicle, or a mobile terminal, which is portable from the vehicle. The route search section is further configured to calculate, from a specific departure point to a specific destination, (i) an optimal route for the in-vehicle terminal in a case where the terminal determination section determines that the display terminal of the optimal route is the in-vehicle terminal, and (ii) an optimal route for the mobile terminal in a case where the terminal determination section determines that the display terminal of the optimal route is the mobile terminal. The optimal route from the specific departure point to the specific destination for the in-vehicle terminal is different from the optimal route from the specific departure point to the specific destination for the mobile terminal.

Under such a configuration, with respect to the specific departure point and the specific destination, the optimal route calculated in a case where the display terminal of the optimal route is the in-vehicle terminal, is different from the optimal route calculated in a case where the display terminal of the optimal route is the mobile terminal. Thus, after changing the travel mode from the vehicle to public transportation, the optimal route is calculated with the terminal portability under consideration, thereby increasing convenience of the multimodal route search.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

[First Embodiment]

Figure 1:
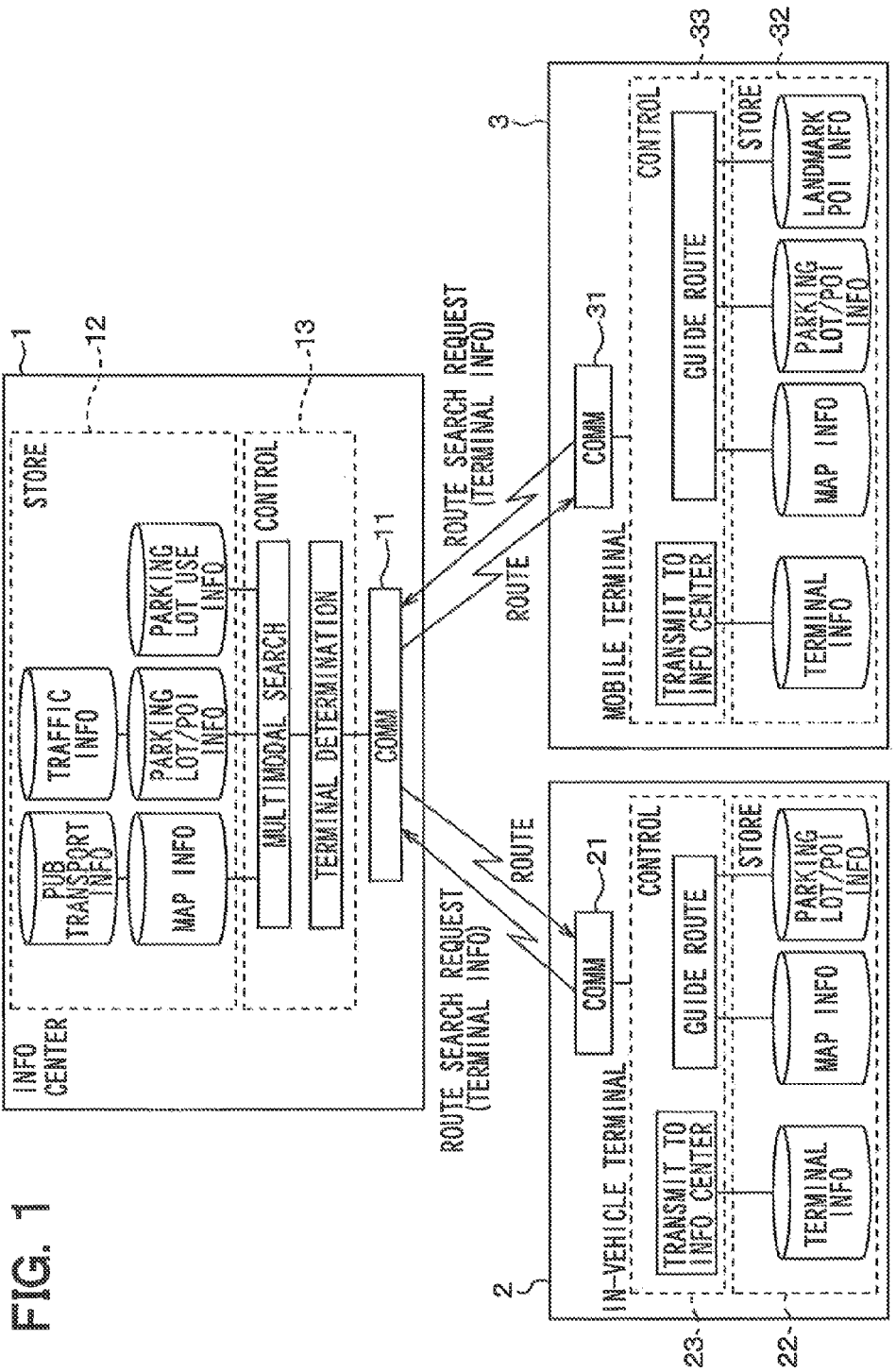
FIG. 1 is a block diagram illustrating an information center, an in-vehicle terminal, and a mobile terminal according to embodiments of the present disclosure.

A route calculation apparatus according to a first embodiment of the present disclosure will be described. In the present embodiment, an information center 1 functions as the route calculation apparatus. FIG. 1 illustrates configurations of the information center 1, an in-vehicle terminal 2, and a mobile terminal 3. In the present embodiment, a terminal, such as the in-vehicle terminal 2 or the mobile terminal 3, transmits a route search request to the information center 1. When receiving a route search request from a terminal (the in-vehicle terminal 2 or the mobile terminal 3), the information center 1 searches for and calculates an optimal route, which will be displayed on the terminal that transmits the route search request. Then, the information center 1 transmits optimal route information to the terminal that transmits the route search request.

The in-vehicle terminal 2 is fixed in a vehicle as a non-portable terminal from the vehicle; thus, the in-vehicle terminal 2 cannot be carried out of the vehicle. For example, the in-vehicle terminal 2 may include a navigation apparatus mounted and fixed in the vehicle, and a personal navigation device (PND) mounted and fixed in the vehicle. It is noted that the vehicle in the present embodiment is a non-public vehicle that is other than a public vehicle that belongs to a public transportation to be explained later again.

The mobile terminal 3 is a portable terminal from the vehicle; the portable terminal can be used in the vehicle and out of the vehicle. When the mobile terminal 3 is used out of the vehicle, the mobile terminal 3 displays and guides a walking route and a public transportation route. For example, the mobile terminal 3 may include a smart phone, a mobile phone, and a portable communicable PND. The information center 1 may be located at a place under a condition that the information center 1 is communicable with the in-vehicle terminal 2, and the mobile terminal 3 via a communication path. For example, the information center 1 may be located inside a building, outside a building, along a road, inside a vehicle. The communication path may be a wireless communication path, or a combination of a wireless communication path and a wired communication path, such as internet.

In the present embodiment, the optimal route calculated by the information center 1 is an optimal route using (i) public transportation (i.e., railway trains and buses) and (ii) a vehicle other than a public vehicle that belongs to the public transportation. For example, the optimal route may include (i) a driving route from a present position of a vehicle to a parking lot, e.g., for so-called park-and-ride, near a station of a railway, (ii) a walking route from the parking lot to the station of the railway, (iii) a route from the station to a station near a destination by train, and (iv) a walking route from the station near the destination to the destination. Here, the above parking lot for park-and-ride may be referred to as a park-and-ride parking lot; the above station for park-and-ride may be referred to as a park-and-ride station. As described above, searching for a route using the public transportation (i.e., railway trains and buses) and a vehicle other than a public vehicle that belongs to the public transportation is referred to as a multimodal route search.

The information center 1 identifies a display terminal as either the non-portable in-vehicle terminal 2 or the portable mobile terminal 3, according to information included in the route search request received from the terminal that transmits the route search request. The display terminal is a terminal on which the optimal route will be displayed. When the route search request is transmitted from the in-vehicle terminal 2, the display terminal is the in-vehicle terminal 2. When the route search request is transmitted from the mobile terminal 3, the display terminal is the mobile terminal 3. Hereinafter, the terminal that transmits the route search request is also referred to as a request terminal. When determining that the in-vehicle terminal 2 is the display terminal, the information center 1 searches for the optimal route in a different route search method compared with a case where the mobile terminal 3 is determined to be the display terminal.

For example, when receiving the route search request from the in-vehicle terminal 2, the information center 1 calculates an optimal route including a relatively easy-to-find parking lot facing a road to park the vehicle, and a station to board a train, which enables a convenient transfer, for example, a Japanese railway (JR) station. Then, the information center 1 transmits the calculated optimal route information to the in-vehicle terminal 2. Further, when receiving the route search request from the mobile terminal 3, the information center 1 calculates an optimal route including a parking lot located at underground or a complexly structured place, and a station or a stop of a subway, a private railway, or a bus. Hereinafter, the station may include a railway station, a bus station, and a bus stop. Then, the information center 1 transmits calculated optimal route information to the mobile terminal 3.

A configuration of the information center 1 will be described with reference to FIG. 1. The information center 1 includes a communication portion 11, a storing portion 12, and a control circuit 13. The communication portion 11 is a communication interface circuit, which enables a communication between the information center 1 and the in-vehicle terminal 2, and a communication between the information center 1 and the mobile terminal 3. The storing portion 12 is a storage media for storing information, which is necessary for a route search.

The information stored in the storing portion 12 includes public transportation information, map information, traffic information, parking lot and point of interest (POI) information, and parking lot usage information.

The public transportation information includes timetable information of the public transportation (i.e., railway trains and buses), such as arrival time and corresponding arrival station of a train or a bus. The map information includes location information of a road, and connection information among two or more roads. The traffic information includes information indicating a congestion degree of a road, and is updated at predetermined time intervals. The parking lot and POI information includes information indicating locations of parking lots and information indicating locations of other POIs. Other POIs may include a department store, a restaurant, a railway station, and a bus station (stop). The parking lot usage information includes information indicating usage of each parking lot, such as available space percentage of a parking lot or the number of vehicles, which can be parked in a parking lot. The parking lot usage information is updated at predetermined time intervals.

The control circuit 13 is a process unit to achieve various functions by executing programs stored in a storage media, such as a read only memory (ROM). Processes executed by the control circuit 13 include a multimodal route search, and a terminal determination.

The in-vehicle terminal 2 includes a communication portion 21, a storing portion 22, and a control circuit 23. The communication portion 21 is a wireless interface for communicating with the information center 1. The storing portion 22 is a storage media in which terminal information, map information, and parking lot and POI information are stored. The terminal information may be information indicating a type (portable/non-portable) of the in-vehicle terminal 2, or an identifier (ID) of the in-vehicle terminal 2. The terminal information indicates that the in-vehicle terminal 2 is a non-portable type terminal, and the in-vehicle terminal 2 cannot be carried out of the vehicle. The map information and the parking lot and POI information stored in the storing portion 22 of the in-vehicle terminal 2 may be similar to the map information and the parking lot and POI information stored in the storing portion 12 of the information center 1. The control circuit 23 is a process unit to achieve various functions by executing programs stored in a storage media, such as a ROM. Processes executed by the control circuit 23 include transmission, and route guidance. In the transmission process, the control circuit 23 transmits the terminal information to the information center 1. In the route guidance process, the control circuit 23 guides the optimal route received from the information center 1 to the user.

The mobile terminal 3 includes a communication portion 31, a storing portion 32, and a control circuit 33. The communication portion 31 is a wireless interface for communicating with the information center 1. The storing portion 32 is a storage media in which terminal information, map information, parking lot and POI information, and landmark POI information are stored. The terminal information may be information indicating a type (portable/non-portable) of the mobile terminal 3, or an identifier (ID) of the mobile terminal 3. The terminal information indicates that the mobile terminal 3 is a portable type terminal, and the mobile terminal 3 can be carried out of the vehicle for further usage as a navigator of a walking route. The map information and the parking lot and POI information stored in the storing portion 32 of the mobile terminal 3 may be similar to the map information and the parking lot and POI information stored in the storing portion 12 of the information center 1. The landmark POI information is indicative of names and locations of predetermined landmarks, which are only necessary while traveling on foot (a walking route). The control circuit 33 is a process unit to achieve various functions by executing programs stored in a storage media, such as a ROM. Processes executed by the control circuit 33 include transmission, and route guidance. In the transmission process, the control circuit 33 transmits the terminal information to the information center 1. In the route guidance process, the control circuit 33 guides the optimal route received from the information center 1 to the user.

Figure 2:
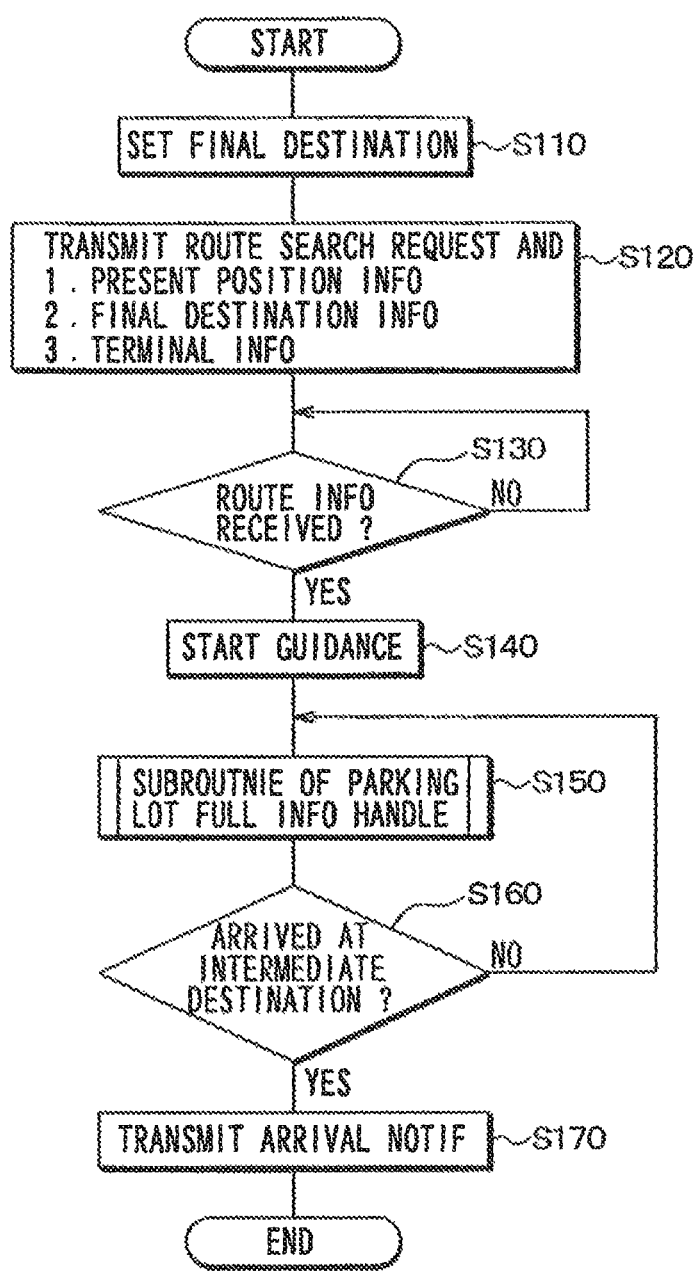
FIG. 2 is a flowchart illustrating a process executed by a terminal (the in-vehicle terminal or the mobile terminal)
Figure 3:
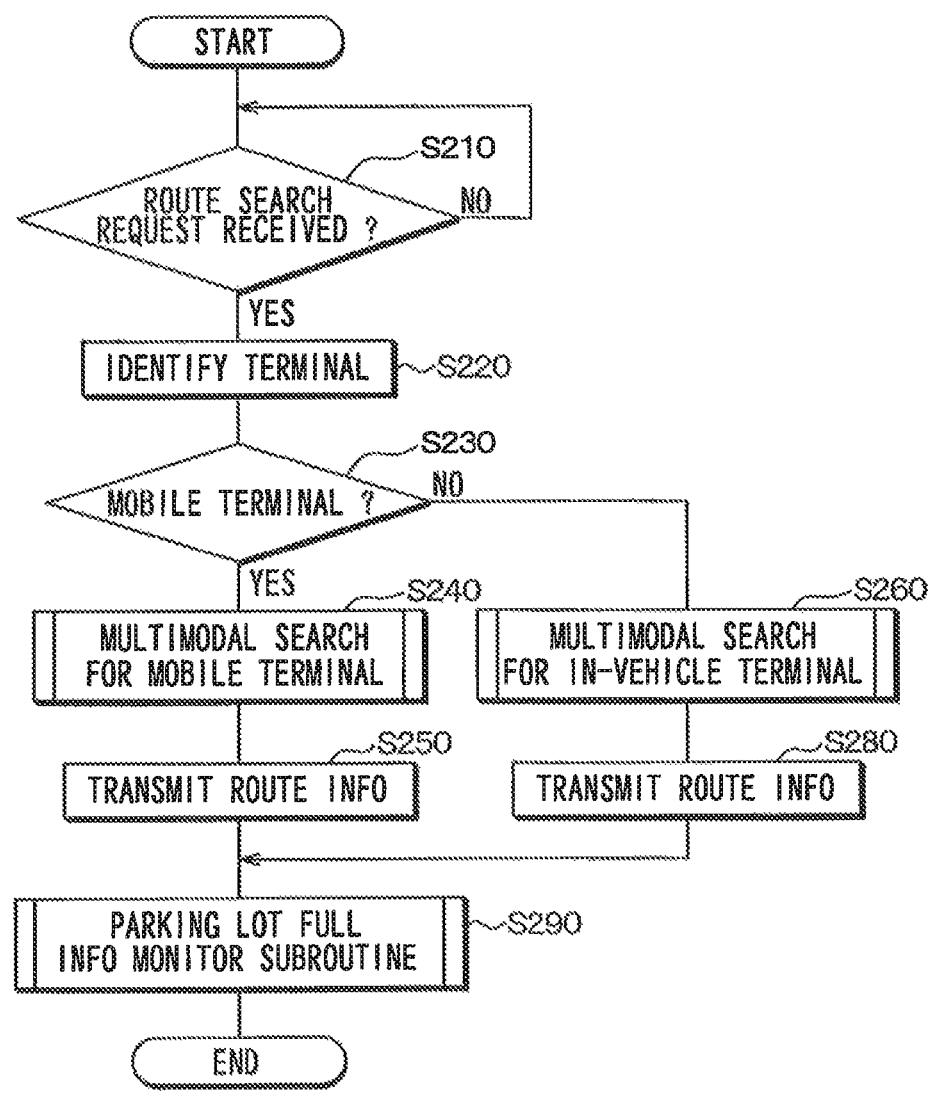
FIG. 3 is a flowchart illustrating a process executed by the information center.

An operation of a navigation system configured by the information center 1, the in-vehicle terminal 2, and the mobile terminal 3 will be described. FIG. 2 shows a process executed by a control circuit (the control circuit 23 or the control circuit 33) of a terminal (the in-vehicle terminal 2 or the mobile terminal 3) according to a program. FIG. 3 shows a process executed by the control circuit 13 of the information center 1.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

The following will explain an operation of the navigation system in a case where the mobile terminal 3 transmits a route search request to the information center 1. In this case, a user of the mobile terminal 3 carries the mobile terminal 3, and boards a vehicle other than a public vehicle that belongs to the public transportation. Then, the user inputs a final destination to the mobile terminal 3 via an input apparatus (not shown), such as a touch panel or a mechanical switch. When the user inputs the final destination to the mobile terminal 3, the control circuit 33 of the mobile terminal 3 determines the final destination at S110 shown in FIG. 2. Then, the process proceeds to S120.

At S120, the control circuit 33 of the mobile terminal 3 transmits the route search request to the communication portion 11 of the information center 1 via the communication portion 31 of the mobile terminal 3. The route search request includes vehicle position information, final destination information, and terminal information. The vehicle position information is indicative of a present position of the vehicle (in this case, a present position of the mobile terminal 3). The final destination information is indicative of the final destination determined at S110. The terminal information is stored in the storing portion 32 of the mobile terminal 3 or the like. The vehicle position information may be obtained by, for example, global positioning system (GPS) receiver (not shown) provided in the vehicle. Then, at S130, the mobile terminal 3 is in a standby state until receiving the optimal route information from the information center 1.

The following will explain an operation of the navigation system in a case where the in-vehicle terminal 2 transmits the route search request to the information center 1. At S120, the control circuit 23 of the in-vehicle terminal 2 transmits the route search request to the communication portion 11 of the information center 1 via the communication portion 21 of the in-vehicle terminal 2. The route search request may include vehicle position information, final destination information, and terminal information. The vehicle position information is indicative of a present position of the vehicle. The final destination information is information about the final destination determined at S110. The terminal information is stored in the storing portion 22 of the in-vehicle terminal 2. Then, at S130, the in-vehicle terminal 2 is in a standby state until receiving the optimal route information from the information center 1.

When the route search request is received by the communication portion 11 of the information center 1, the control circuit 13 of the information center 1 obtains the route search request from the communication portion 11 of the information center 1. Then, the control circuit 13 determines that the route search request is successfully received (S210: "YES"). Then, the process proceeds to S220.

At S220, the control circuit 13 of the information center 1 identifies the request terminal as the in-vehicle terminal 2 or the mobile terminal 3, according to the terminal information included in the route search request. Specifically, the control circuit 13 of the information center 1 identifies the request terminal by reading out the terminal information, and comparing the terminal information with reference information (not shown) stored in the storing portion 12 of the information center 1, or in a ROM. The reference information defines that what kind of terminal information indicates the in-vehicle terminal 2, and what kind of terminal information indicates the mobile terminal 3.

At S230, the control circuit 13 of the information center 1 determines whether the request terminal of the route search request is the mobile terminal 3. That is, the control circuit 13 determines whether the display terminal of the optimal route, which will be calculated later, is the mobile terminal 3. The following will describe a case where the route search request is transmitted from the mobile terminal 3. In this case, the control circuit 13 of the information center 1 determines that the request terminal is the mobile terminal 3. Then, the process proceeds to S240.

Figure 4:
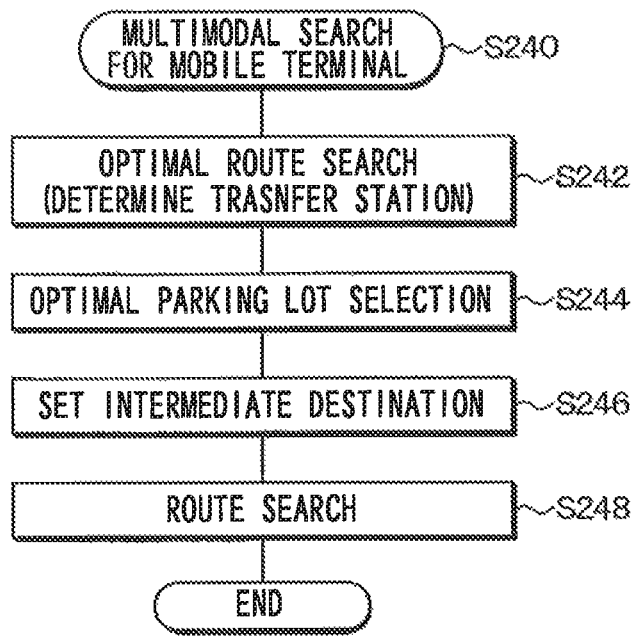
FIG. 4 is a flowchart illustrating a multimodal route substitute search process for the mobile terminal.

At S240, the control circuit 13 of the information center 1 searches for multimodal route substitutes for the mobile terminal 3. FIG. 4 shows details of a multimodal route substitute search process for the mobile terminal 3. First, at S242, the control circuit 13 searches for and calculates an optimal route from a departure point to the final destination.

Figure 5:
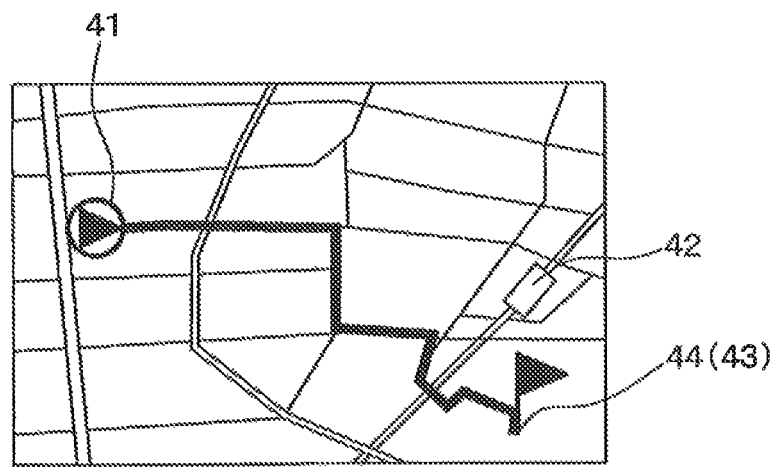
FIG. 5 is a diagram illustrating a route from a present position of a vehicle to an optimal parking lot.

At S242, a route A+B, which is a combination of a route A and a route B, is searched for and calculated as the optimal route. FIG. 5 illustrates a present position 41 of the vehicle, a station 42 of the public transportation, and a parking lot 43 (44). The route A is a route from a present position (the departure point) 41 of the vehicle to a station 42 of the public transportation; the route B is a route from the station 42 to the final destination.

The control circuit 13 of the information center 1 uses the public transportation information, the map information, and the traffic information stored in the storing portion 12 of the information center 1 when calculating the optimal route A+B. The optimal route A+B may be calculated, for example, in the following method. First, a path cost for each path, which configures the route from the present position 41 to the final destination, is calculated; then, a route having a minimum cost is selected as the optimal route A+B. This method is also known as the Dijkstra's Algorithm. Before calculating the path cost for each path, a predetermined reference cost for walking a unit distance, and a predetermined reference cost for each travel mode change are defined for calculating a route cost. The travel mode change may include changing from the vehicle to the public transportation (i.e., a railway train or a bus). At S242, default values are respectively used as the reference costs for walking a unit distance and for a travel mode change from the vehicle to the public transportation.

For example, the optimal route A+B calculated at S242 includes a driving route (not shown in FIG. 5) from the present position 41 to the station 42. Here, the station 42 may be, for example, a railway station 42.

At S244, the control circuit 13 of the information center 1 selects an optimal parking lot 43. The optimal parking lot 43 is used for parking the vehicle; thereby, the user can walk from the optimal parking lot 43 to the station 42 selected in the route A+B calculated at S242. The optimal parking lot 43 may be selected according to a distance (walking time) from the parking lot 43 to the station 42, or may be selected according to a parking fee of the parking lot 43. For example, the optimal parking lot 43 may be selected as a parking lot, which is the nearest (walking time is the shortest) from the station 42. Alternatively, the optimal parking lot 43 may be selected as a parking lot, which has the cheapest parking fee. In a case where a parking lot, which has the shortest walking time to the station 42, is full, a parking lot, which has the second shortest walking time, may be selected. Further, in a case where the parking lots, which have the shortest and second shortest walking time, are both full, a parking lot, which has the third shortest walking time, may be selected. The control circuit 13 of the information center 1 determines whether a parking lot is full according to the parking lot usage information stored in the storing portion 22 of the in-vehicle terminal 2.

At S246, the optimal parking lot 43 is set to an intermediate destination. Then, at S248, the route A is replaced by a route A1. Accordingly, the optimal route A+B is replaced by an optimal route A1+B. The route A1 includes an optimal driving route (illustrated by a bold line in FIG. 5) from the present position 41 to the parking lot 43, and an optimal walking route from the parking lot 43 to the station 42.

As described above, the optimal route A1+B is calculated by the process shown in FIG. 4. The optimal route A1+B includes the driving route from the present position 41 to the optimal parking lot 43, the walking route from the optimal parking lot 43 to the station 42, and the route from the railway station to the final destination by train, or a combination of by train and by walking.

After the process shown in FIG. 4 is ended, at S250 in FIG. 3, the control circuit 13 of the information center 1 transmits information of the calculated optimal route A1+B to the request terminal (mobile terminal 3) of the route search request. The information of the optimal route A1+B includes travel mode information, and travel route information. The travel mode includes traveling by the public transportation (i.e., a railway train or a bus), traveling by a vehicle other than a public vehicle that belongs to the public transportation, and walking.

In the mobile terminal 3, the control circuit 33 receives the information of the optimal route A1+B via the communication portion 31, and determines that the information of the optimal route A1+B is received (S130: "YES"). Then, the process proceeds to S140. At S140, the control circuit 33 of the mobile terminal 3 performs route guidance of the optimal route A1+B to the user. The route guidance is performed by displaying the route on a screen (not shown) of the mobile terminal 3, and notifying the user of a turning point of the route. Thereby, the user can travel along the optimal route A1+B under the route guidance.

When the route guidance starts, the information center 1 performs usage monitoring of the optimal parking lot 43 until the user arrives at the optimal parking lot 43, and notifies the mobile terminal 3 of the usage of the optimal parking lot 43 if necessary. Specifically, the control circuit 13 of the information center 1 transmits the information of the optimal route A1+B to the mobile terminal 3 at S250; then, the control circuit 13 of the information center 1 executes a subroutine process of monitoring the parking lot full information at S290.

Figure 6:
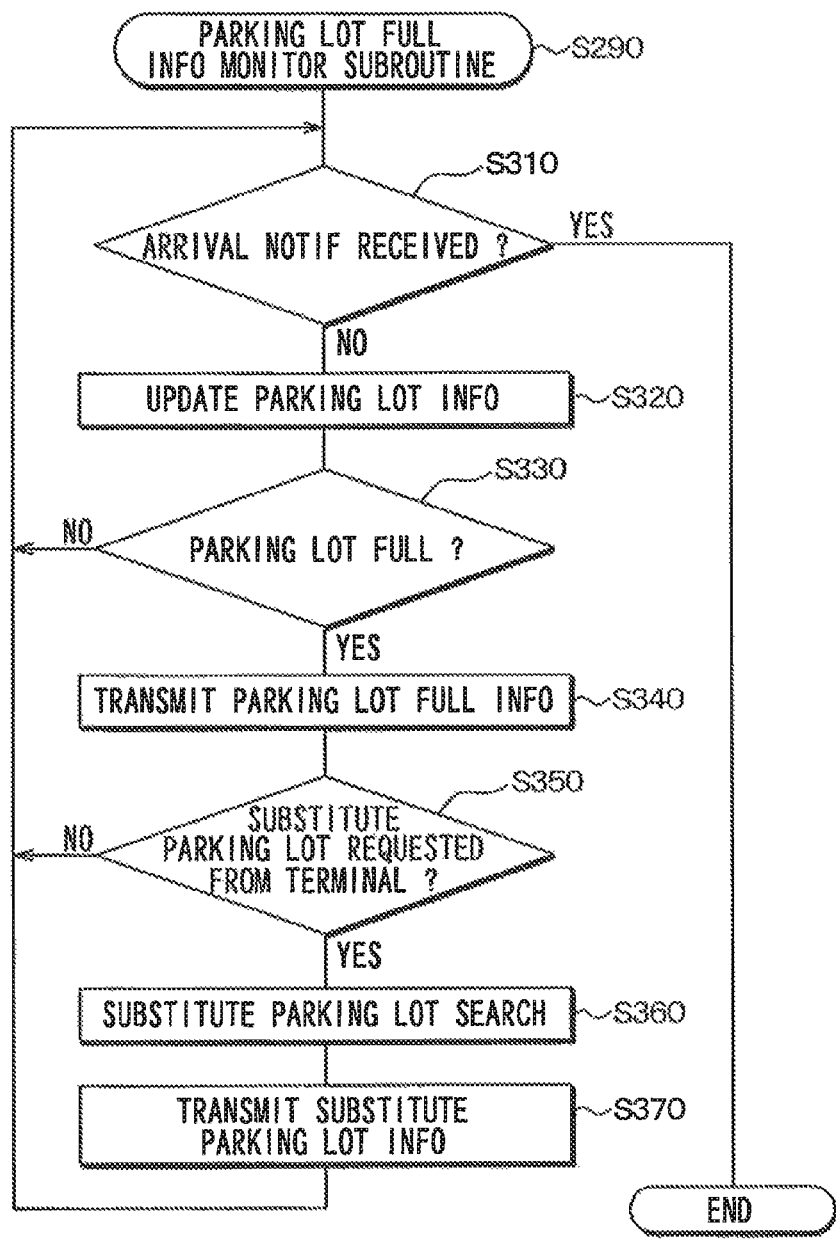
FIG. 6 is a flowchart illustrating a subroutine process for monitoring parking lot full information.

The following will describe the subroutine process of monitoring the parking lot full information with reference to FIG. 6. At S310, the control circuit 13 of the information center 1 determines whether an arrival notification is received from the mobile terminal 3, which performs the route guidance of the optimal route A1+B. The arrival notification indicates that the mobile terminal 3 arrives at the optimal parking lot 43. In a case where the control circuit 13 determines that the arrival notification is not received from the mobile terminal 3 (S310: "NO") the process proceeds to S320.

At S320, the parking lot usage information of the optimal parking lot 43 is updated. The updated usage information of the optimal parking lot 43 may be obtained by, for example, receiving the updated usage information from an information server, which updates parking lot usage information at predetermined time intervals. Thus, the information center 1 is notified of whether the optimal parking lot 43 is available currently.

At S330, the control circuit 13 of the information center 1 determines whether the optimal parking lot 43, which is used for parking the vehicle, is full according to the parking lot usage information received at S320. When the optimal parking lot 43 is not full (S330: "NO"), the process returns to S310.

Figure 7:
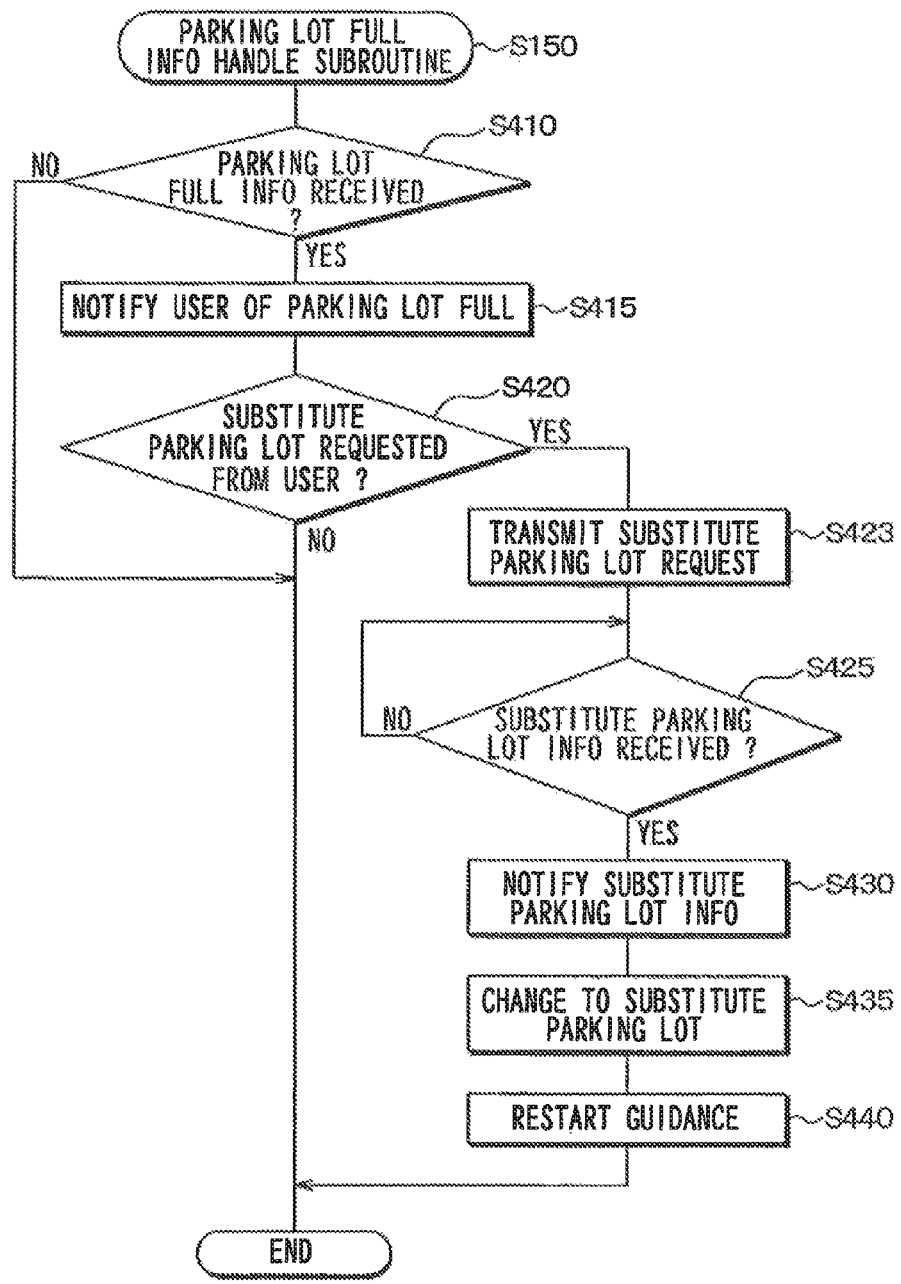
FIG. 7 is a flowchart illustrating a subroutine process of handing the parking lot full information.

When the optimal parking lot 43 is available, S310, S320, and S330 are repeatedly executed until the control circuit 13 of the information center 1 receives the arrival notification, which indicates that the vehicle arrives at the optimal parking lot 43, from the mobile terminal 3. At the same time, in the mobile terminal 3, the control circuit 33 determines that the parking lot full information is not received from the information center 1 (S410: "NO") in a subroutine process of handling the parking lot full information shown in FIG. 7. When determining that the parking lot full information is not received from the information center 1 (S410: "NO"), the control circuit 33 of the mobile terminal 3 ends the subroutine process of handling the parking lot full information, and the process returns to S150 of FIG. 2. The subroutine process of handling the parking lot full information (S150), and determination of vehicle arrival to the optimal parking lot 43 (S160) are repeatedly executed until the vehicle, in which the user of the mobile terminal 3 is, arrives at the optimal parking lot 43. When the vehicle arrives at the optimal parking lot 43, the control circuit 33 of the mobile terminal 3 determines that the vehicle arrives at the optimal parking lot 43 (S160: "YES"), and the process proceeds to S170. At S170, the control circuit 33 of the mobile terminal 3 transmits the arrival notification to the information center 1 via the communication portion 31. When receiving the arrival notification from the mobile terminal 3, the control circuit 13 of the information center 1 determines that the arrival notification is received (S310: "YES" shown in FIG. 6), thereby ending the subroutine process of monitoring the parking lot full information.

The following will describe a case where the optimal parking lot 43 becomes full before the vehicle arrives at the optimal parking lot 43, or when the vehicle arrives at the optimal parking lot 43. In this case, at S320 shown in FIG. 6, the control circuit 13 of the information center 1 obtains the parking lot full information. Then, the control circuit 13 of the information center 1 determines that the optimal parking lot 43 is full (S330: "YES"), and the process proceeds to S340.

At S340, the control circuit 13 of the information center 1 transmits the parking lot full information of the optimal parking lot 43 to the mobile terminal 3. Then, at S350, the control circuit 13 of the information center 1 waits to receive an substitute search request from the mobile terminal 3 for a predetermined time period (i.e., 3 minutes).

In the mobile terminal 3, when receiving the parking lot full information, the control circuit 33 of the mobile terminal 3 determines that the parking lot full information is received (S410: "YES" shown in FIG. 7), and the process proceeds to S415. At S415, the mobile terminal 3 notifies the user that the optimal parking lot 43 is full using a notification apparatus (not shown), such as a display screen, or a speaker.

At S420, the control circuit 33 of the mobile terminal 3 determines whether a request, which is indicative of a selection of a substitute parking lot, is received from the user. The user may perform a predetermined manipulation to a control panel (not shown) of the mobile terminal 3, thereby inputting the selection of a substitute parking lot or a non-selection of a substitute parking lot.

When the user inputs the non-selection of a substitute parking lot (S420: "NO"), the subroutine process of handling the parking lot full information is ended, and the process returns to S150 of FIG. 2. Then, the control circuit 33 of the mobile terminal 3 determines that the vehicle has not arrived at the optimal parking lot 43 (S160: "NO"), and the process returns to S150. In this case, the subroutine process of handling the parking lot full information (S150), and determination of vehicle arrival to the optimal parking lot 43 (S160) are repeatedly executed until the vehicle, in which the user of the mobile terminal 3 is, arrives at the optimal parking lot 43. At S420, since the user input the non-selection of a substitute parking lot, the intermediate destination (the optimal parking lot 43) is not changed. In the information center 1, when the control circuit 13 determines that the substitute search request is not received from the mobile terminal 3 after the predetermined time period elapses (S350: "NO"), the process returns to S310. When the vehicle arrives at the optimal parking lot 43, the control circuit 33 of the mobile terminal 3 determines that the vehicle arrives at the optimal parking lot 43 (S160: "YES"), and the process proceeds to S170. At S170, the control circuit 33 of the mobile terminal 3 sends the arrival notification to the information center 1 via the communication portion 31. When receiving the arrival notification from the mobile terminal 3, the control circuit 13 of the information center 1 determines that the arrival notification is received at (S310: "YES" shown in FIG. 6), thereby ending the subroutine process of monitoring the parking lot full information.

When the user inputs the selection of a substitute parking lot (S420: "YES"), the subroutine process of handling the parking lot full information proceeds to S423. At S423, the control circuit 33 of the mobile terminal 3 transmits the substitute search request to the information center 1 via the communication portion 31 of the mobile terminal 3. Then, at S425, the control circuit 33 waits to receive information of substitute parking lots from the information center 1.

When the control circuit 33 of the mobile terminal 3 transmits the substitute search request to the information center 1 at S423, the control circuit 13 of the information center 1 determines that the substitute search request is received (S350: "YES"). Then, at S360, the control circuit 13 of the information center 1 searches for a substitute parking lot. The substitute parking lot may be a parking lot, which is the nearest from the present optimal parking lot 43. When searching for a substitute parking lot, a parking lot being full is excluded from search targets. Then, at S370, the control circuit 13 of the information center 1 transmits substitute parking lot information (location information) to the mobile terminal 3, and the process returns to S310.

When the control circuit 33 of the mobile terminal 3 receives the substitute parking lot information (S425: "YES"), the process proceeds to S430. At S430, the control circuit 33 of the mobile terminal 3 notifies the user of the substitute parking lot information. Then, at S435, the control circuit 33 of the mobile terminal 3 replaces the present optimal parking lot 43 with the substitute parking lot, and calculates a route A2. The route A2 includes a driving route from the present position of the vehicle to the new optimal parking lot (substitute parking lot), and a walking route from the new optimal parking lot to the station 42. At S440, the control circuit 33 of the mobile terminal 3 restarts the route guidance of the route A2. Then, the control circuit 33 ends the subroutine process of handling the parking lot full information shown in FIG. 7.

The subroutine process of handling the parking lot full information (S150), and determination of vehicle arrival to the optimal parking lot 43 (S160) are repeatedly executed until the vehicle arrives at the new optimal parking lot (substitute parking lot). When the vehicle arrives at the new optimal parking lot (substitute parking lot), the control circuit 33 of the mobile terminal 3 determines that the vehicle arrives at the optimal parking lot 43 (S160: "YES"), and the process proceeds to S170. At S170, the control circuit 33 of the mobile terminal 3 transmits the arrival notification to the information center 1 via the communication portion 31. When receiving the arrival notification from the mobile terminal 3, the control circuit 13 of the information center 1 determines that the arrival notification is received (S310: "YES" shown in FIG. 6), thereby ending the subroutine process of monitoring the parking lot full information.

The control circuit 13 of the mobile terminal 3 continuously performs route guidance to the user after S170 is ended, thereby guiding a remained route. The remained route includes a route from the new optimal parking lot to the station 42, and a route from the station 42 to the final destination.

The following will explain an operation of the navigation system in a case where the in-vehicle terminal 2 transmits the route search request to the information center 1. In this case, until S170 of FIG. 2, the operation of the in-vehicle terminal 2 is similar to the operation of the mobile terminal 3 as described above. Specifically, the communication portion 21, the storing portion 22, the control circuit 23 of the in-vehicle terminal 2 operate similarly to the communication portion 31, the storing portion 32, the control circuit 33 of the mobile terminal 3, respectively, as described above. The operation of the in-vehicle terminal 2 is different from the operation of the mobile terminal 3 in two points.

(i) After S170, since the in-vehicle terminal 2 cannot be carried out of the vehicle, the route guidance provided by the in-vehicle terminal 2 is ended. In contrast, when the mobile terminal 3 provides the route guidance, the mobile terminal 3 continues the route guidance of the remained route to the user after S170.

(ii) Further, in a case where the in-vehicle terminal 2 transmits the route search request to the information center 1, the request terminal of the route search request is the in-vehicle terminal 2 (not the mobile terminal 3). Thus, the control circuit 13 of the information center 1 determines that the request terminal is not the mobile terminal 3 (S230: "NO"), and the process proceeds to S260. Then, S260, and S280 are executed instead of S240, and S250.

Figure 8:
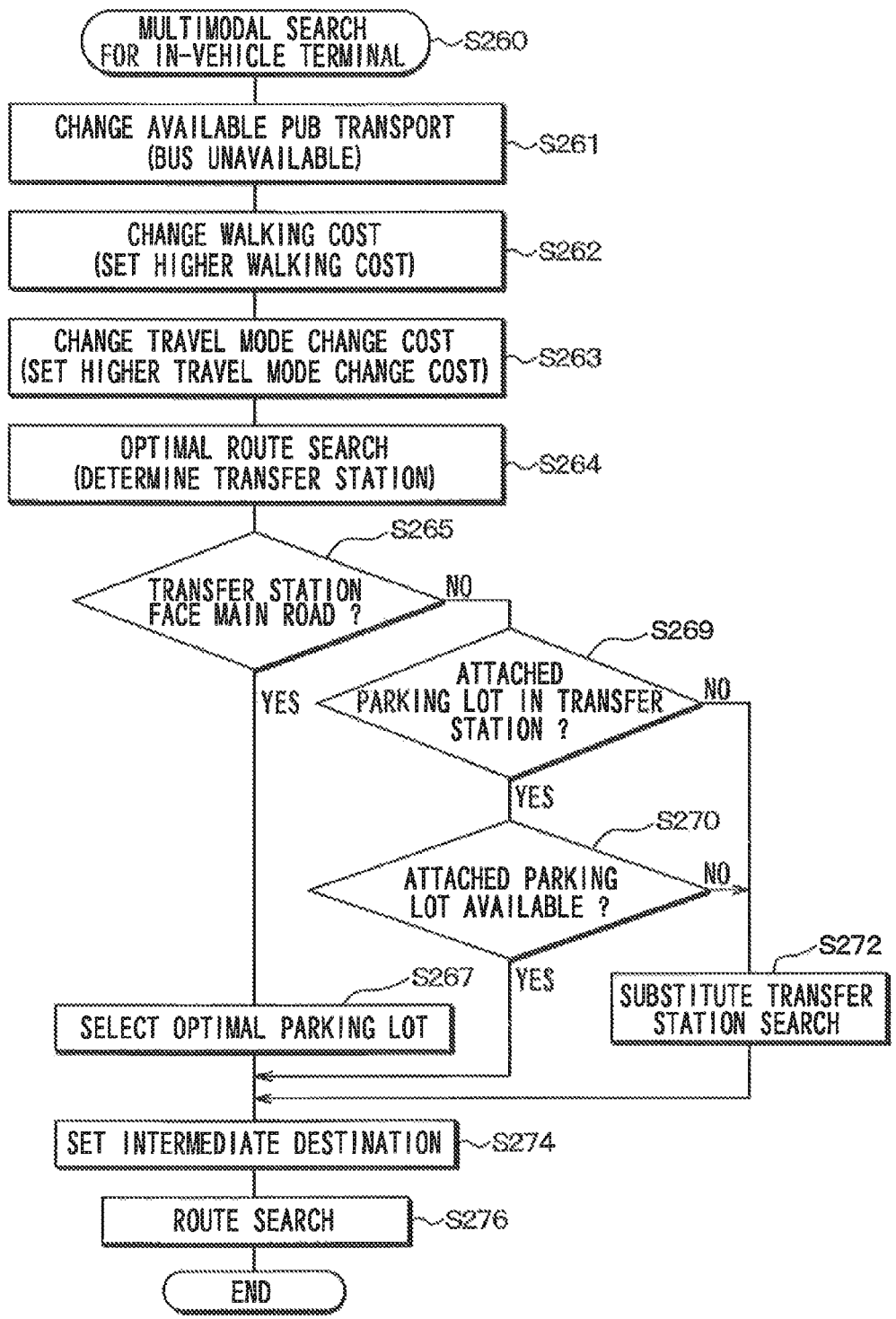
FIG. 8 is a flowchart illustrating a multimodal route substitute search process for the in-vehicle terminal.

At S260, the control circuit 13 of the information center 1 searches for multimodal route substitutes for the in-vehicle terminal 2. FIG. 8 shows details of a multimodal route substitute search process for the in-vehicle terminal 2. First, at S261, the control circuit 13 replaces search targets of public transportation routes for the mobile terminal 3 with search targets of public transportation routes for the in-vehicle terminal 2. The search targets of public transportation routes include available public transportation routes. Specifically, the control circuit 13 of the information center 1 excludes the bus from the public transportation, thereby excluding routes traveling by bus (bus routes) from the search targets.

Since the in-vehicle terminal 2 cannot be carried out of the vehicle, the in-vehicle terminal 2 cannot be used for route guidance during the user walking from the parking lot to a station of the public transportation. Further, a bus station (stop) is normally smaller and relatively more difficult to be found than a railway station. Thus, bus routes are excluded from the search targets.

At S262, the control circuit 13 of the information center 1 sets a predetermined reference cost for walking a unit distance, which is used for calculating a path cost, higher than the predetermined reference cost for walking a unit distance used in the multimodal route substitute search process for the mobile terminal 3 shown in FIG. 4. Accordingly, a path having a long distance from the parking lot to the station is less likely to be selected in the optimal route because of the higher walking cost. Thus, the user is less likely to walk a long distance without the route guidance terminal; thereby, the user is less likely to become disoriented.

At S263, the control circuit 13 of the information center 1 sets a predetermined reference cost for each travel mode change, which is used for calculating a path cost, higher than the predetermined reference cost for each travel mode change used in the multimodal route substitute search process for the mobile terminal 3 shown in FIG. 4. Here, the travel mode change signifies a travel mode change from one travel mode to another travel mode, such as (i) a change from traveling with a vehicle to walking, (ii) a change from a walking to traveling with a vehicle, (iii) a change from traveling with a vehicle to traveling with a railway train, and (iv) a change from traveling with a railway train to walking. Since the user travels without the route guidance terminal, the user is more likely to become disoriented when the number of travel mode changes (also referred to as a travel mode changes count) increases. In the present embodiment, in a case where the display terminal of the optimal route is the in-vehicle terminal 2, the predetermined reference cost for each travel mode change is set higher than a case where the display terminal of the optimal route is the mobile terminal 3. Thus, when calculating the optimal route, the number of travel mode changes is decreased, thereby decreasing risk associated with the travel mode change.

At S264, the control circuit 13 of the information center 1 searches for a route from the present position of the vehicle to the final destination according to the settings changed in S261, S262, and S263. At S264, a route A+B, which is a combination of a route A and a route B, is searched for and calculated as the optimal route similar to S242 of FIG. 4. Similarly, the route A is a route from the present position (the departure point) 41 of the vehicle to a station of the public transportation; the route B is a route from the station to the final destination. Since the route search is performed according to the settings changed in S261, S262, and S263, the station (an end point of the route A) of the public transportation, which is searched for at S264 may be different from the station of the public transportation, which is searched for at S242 of FIG. 4.

Figure 9:
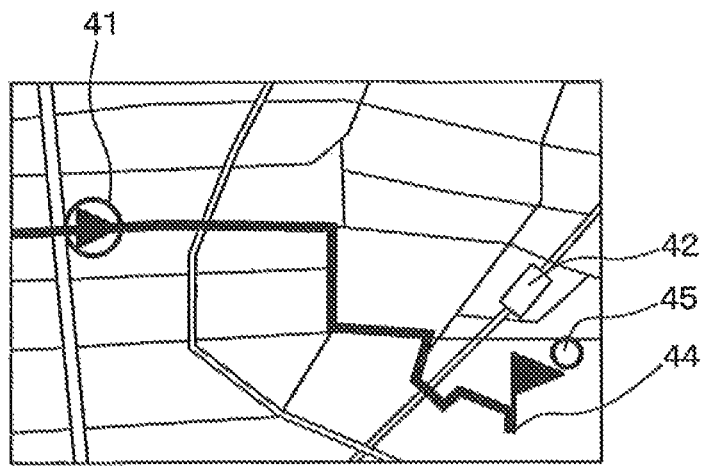
FIG. 9 is a diagram illustrating a route from a present position of a vehicle to an optimal parking lot.
Figure 10:
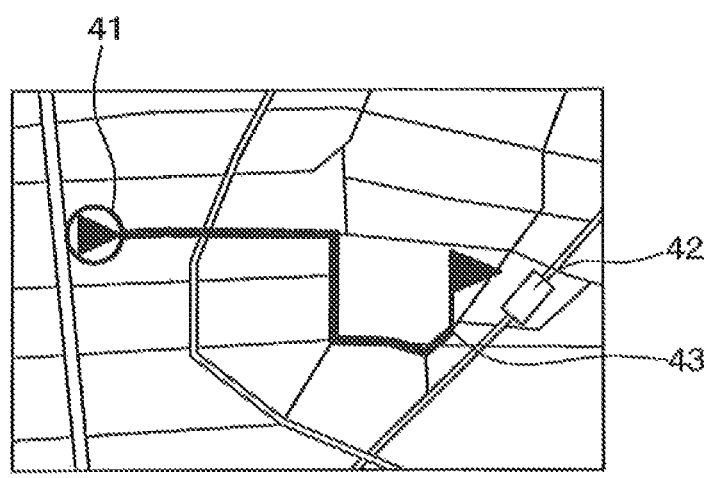
FIG. 10 is a diagram illustrating a route from a present position of a vehicle to an optimal parking lot.

For example, as shown in FIG. 9, a bus station (stop) 45 is selected as the station of the public transportation with respect to a specific departure point and a specific final destination set at S242 of FIG. 4. With respect to the specific departure point and the specific final destination, as shown in FIG. 10, a railway station 42 may be selected as the station of the public transportation at S264 of FIG. 8. In some cases, the same station of the public transportation may be selected at S242 and S264.

At S265, the control circuit 13 of the information center 1 determines whether the station faces a predetermined main road according to the map information stored in the storing portion 12. Here, the station is the end point of the route A searched for at S264, and does not include a bus station (stop). Further, predetermined main roads may be previously defined as, for example, an expressway, a national road, and a prefectural road.

When the control circuit 13 of the information center 1 determines that the station faces a main road (S265: "YES"), the process proceeds to S267. At S267, the control circuit 13 of the information center 1 selects an optimal parking lot with respect to the station in a similar manner to S244 of FIG. 4. The predetermined reference costs for walking a unit distance are set differently between a case where the route search request is transmitted from the mobile terminal 3 and a case where the route search request is transmitted from the in-vehicle terminal 2. Thus, in a case where the station selected at S264 of FIG. 8 is the same with the station selected at S242 of FIG. 4, the optimal parking lot selected at S267 of FIG. 8 may be different from the optimal parking lot selected at S244 of FIG. 4. For example, a parking lot 44, which is located at a complexly structured place, may be selected at S244 (shown in FIG. 4) with respect to the specific departure point 41, the specific final destination, and a station 42 as shown in FIG. 9. In contrast, a parking lot 43, which is located near the station 42, may be selected at S267 (shown in FIG. 8) with respect to the specific departure point 41, the specific final destination, and the same station 42 as shown in FIG. 10.

At S274, the control circuit 13 of the information center 1 sets the selected optimal parking 43 to the intermediate destination. Then, at S276, the control circuit 13 searches for and calculates a route A1, and replaces the route A with the route A1 that is newly searched for and calculated. Accordingly, the optimal route A+B is replaced by an optimal route A1+B, The route A1 includes an optimal driving route (illustrated by a bold line in FIG. 10) from the present position 41 to the optimal parking lot 43, and an optimal walking route from the optimal parking lot 43 to the station 42. Then, the control circuit 13 ends the process shown in FIG. 8, and the process proceeds to S280 of FIG. 3. At S280, the control circuit 13 transmits information of the calculated optimal route A1+B to the request terminal (in-vehicle terminal 2) of the route search request. The information of the optimal route A1+B includes travel mode information, and travel route information.

When the control circuit 13 of the information center 1 determines that the station does not face a main road (S265: "NO"), the process proceeds to S269. Generally, when the user walks to a station without a route guidance terminal from the optimal parking lot, the user may have a difficulty in finding a station, which does not face a main road.

At S269, the control circuit 13 of the information center 1 determines whether an attached parking lot that is attached to a station is provided to the station, which is the end point of the route A, according to the map information. When the control circuit 13 determines that the attached parking lot is provided to the station (S269: "YES"), the process proceeds to S270. At S270, the control circuit 13 determines whether the attached parking lot provided at the station is full according to parking lot usage information. When the control circuit 13 determines that the attached parking lot is available (S270: "YES"), the process proceeds to S274. At S274, the control circuit 13 sets the attached parking lot provided to the station as the intermediate destination, and the process proceeds to S276. Process executed at S276 and processes after S276 are similar to the above-described processes.

When the control circuit 13 of the information center 1 determines that an attached parking lot is not provided to the station (S269: "NO"), the process proceeds to S272. When the control circuit 13 determines that the attached parking lot is unavailable or full (S270: "NO"), the process proceeds to S272. At S272, the control circuit 13 restarts searching for a new transfer station, which is the end point of the route A. Specifically, the control circuit 13 searches target stations, which are connected with the station searched for at S264 via railways and have available parking lots, for a new transfer station. Then, at S274, the control circuit 13 sets an attached parking lot provided to the new transfer station, which is searched for at S272, as the intermediate destination. Process executed at S276 and processes after S276 are similar to the above-described processes. Under this configuration, when the user is guided by the in-vehicle terminal 2, which cannot be carried out of the vehicle, a station, which is easy to be found by walking, is selected as a transfer station.

As described above, the information center 1 determines whether the display terminal of the optimal route is the non-portable in-vehicle terminal 2 or the portable mobile terminal 3. The determination is performed by a terminal determination section (S230). Then, with respect to the specific departure point and the specific final destination, the information center 1 calculates different optimal routes according to a terminal determination result determined by the terminal determination section. The route search is performed by a route search section (S240, S260).

With respect to the specific departure point and the specific final destination, an optimal route calculated in a case where the display terminal of the optimal route is the in-vehicle terminal 2, is different from an optimal route calculated in a case where the display terminal of the optimal route is the mobile terminal 3. Herein, an in-vehicle terminal displaying optimal route is defined as being an optimal route from a specific departure point to a specific destination calculated in an in-vehicle terminal displaying case that is the case where the display terminal of the optimal route is the in-vehicle terminal 2; a mobile terminal displaying optimal route is defined as an optimal route from the specific departure point to the specific destination calculated in a mobile terminal displaying case that is the case where the display terminal of the optimal route is the mobile terminal 3. Therefore, the calculated in-vehicle terminal displaying optimal route from the specific departure point to the specific destination in the in-vehicle terminal displaying case is different from the calculated mobile terminal displaying optimal route from the specific departure point to the specific destination in the mobile terminal displaying case. Thus, after changing the travel mode from the vehicle to the public transportation, the optimal route is calculated with the terminal portability under consideration, thereby increasing convenience of the multi-modal route search.

In a case where (i) the user transfers from the vehicle to the public transportation, and (ii) the route guidance terminal is not available after the transfer, it may be inconvenient for the user to use the public transportation (a station) for a reason that a location of the station is difficult to understand or find according to a type of the public transportation. Thus, as described above, the information center 1 limits available types of the public transportation in a case where the display terminal of the optimal route is the in-vehicle terminal 2, compared with a case where the display terminal of the optimal route is the mobile terminal 3. Therefore, the multimodal route search is performed according to a characteristic of the in-vehicle terminal 2, and a characteristic of the mobile terminal 3.

In a case where (i) the user transfers from the vehicle to the public transportation, and (ii) the route guidance terminal is not available after the transfer, the user is more likely to become disoriented while traveling on foot Thus, as described above, the information center 1 sets a higher predetermined reference cost for walking a unit distance in a case where the display terminal of the optimal route is the in-vehicle terminal 2, compared with a case where the display terminal of the optimal route is the mobile terminal 3. Therefore, the optimal route is calculated with risk of becoming disoriented suppressed.

When the number of travel mode changes increases, traveling without the route guidance is more difficult to the user. Thus, as described above, the information center 1 sets a higher predetermined reference cost for each travel mode change in a case where the display terminal of the optimal route is the in-vehicle terminal 2, compared with a case where the display terminal of the optimal route is the mobile terminal 3. Therefore, the optimal route is calculated with risk of travel mode change suppressed.

In a case where (i) the user transfers from the vehicle to the public transportation, and (ii) the route guidance terminal is not available after the transfer, it may be inconvenient for the user to use a station for a reason that a walking route from a parking lot to the station is difficult to understand or find because of a location of the station. Thus, as described above, the information center 1 selects a different station of the public transportation as the optimal route in a case where the display terminal of the optimal route is the in-vehicle terminal 2, compared with a case where the display terminal of the optimal route is the mobile terminal 3. Here, the station of the public transportation includes a railway station, and a bus station (stop). Therefore, an optimal station is selected depending on a type of the route guidance terminal.

In a case where (i) the user transfers from the vehicle to the public transportation, and (ii) the route guidance terminal is not available after the transfer, it may be inconvenient for the user to use a parking lot for a reason that a walking route from the parking lot to a station is difficult to understand or find because of a location of the parking lot. Thus, as described above, the information center 1 selects a different parking lot as the optimal route in a case where the display terminal of the optimal route is the in-vehicle terminal 2, compared with a case where the display terminal of the optimal route is the mobile terminal 3; thereby, the user parks the vehicle at the parking lot and walks to the station of the public transportation. Therefore, an optimal parking lot is selected depending on a type of the route guidance terminal.

Further, the information center 1 determines whether a station of the public transportation, to which the user changes from the vehicle, faces a predetermined main road. When determining that the station does not face a predetermined main road, the information center 1 further determines whether an attached parking lot is provided to the station. In a case where an attached parking lot is provided to the station, the information center 1 selects the attached parking lot provided to the station so that the user can park the vehicle and walk to the station. In a case where any attached parking lot is not provided to the station, the information center 1 changes a public transportation station of the optimal route.

When the user changes from the vehicle to the public transportation, a public transportation station, which faces a main road, is easy to be found by the user, compared with a public transportation station, which does not face a main road. Thus, under the above-described configuration, a public transportation station is selected according to a characteristic of the in-vehicle terminal 2, which cannot be carried out of the vehicle. Further, in a case where an attached parking lot is provided in the public transportation station, which does not face a main road and to be used after traveling with vehicle, the user is less likely to become disoriented even without route guidance. Thus, in this case, the attached parking lot provided in the public transportation station is selected as an optimal parking lot in the optimal route for parking; thereby the user changes the travel mode from the vehicle to the public transportation.

Further, the information center 1 determines whether a parking lot is full while the user traveling along the calculated optimal route with the vehicle. The parking lot is used for parking the vehicle so that the user can walk from the parking lot to a public transportation station in order to change from the vehicle to the public transportation. When determining that the parking lot is full, the information center 1 searches for a substitute parking lot. Since a determination of availability of the parking lot and a substitute parking lot search are performed during traveling with the vehicle, the user is less likely to be guided to a parking lot, which is full when the user arrives at the parking lot.

[Second Embodiment]

A route calculation apparatus according to a second embodiment of the present disclosure will be described. In the present embodiment, the control circuit 13 of the information center 1, which corresponds to the route calculation apparatus, executes processes shown in FIG. 11 instead of processes shown in FIG. 2. Further, the control circuit 23 of the in-vehicle terminal 2 and the control circuit 33 of the mobile terminal 3 execute processes shown in FIG. 12 instead of processes shown in FIG. 3.

Figure 11:
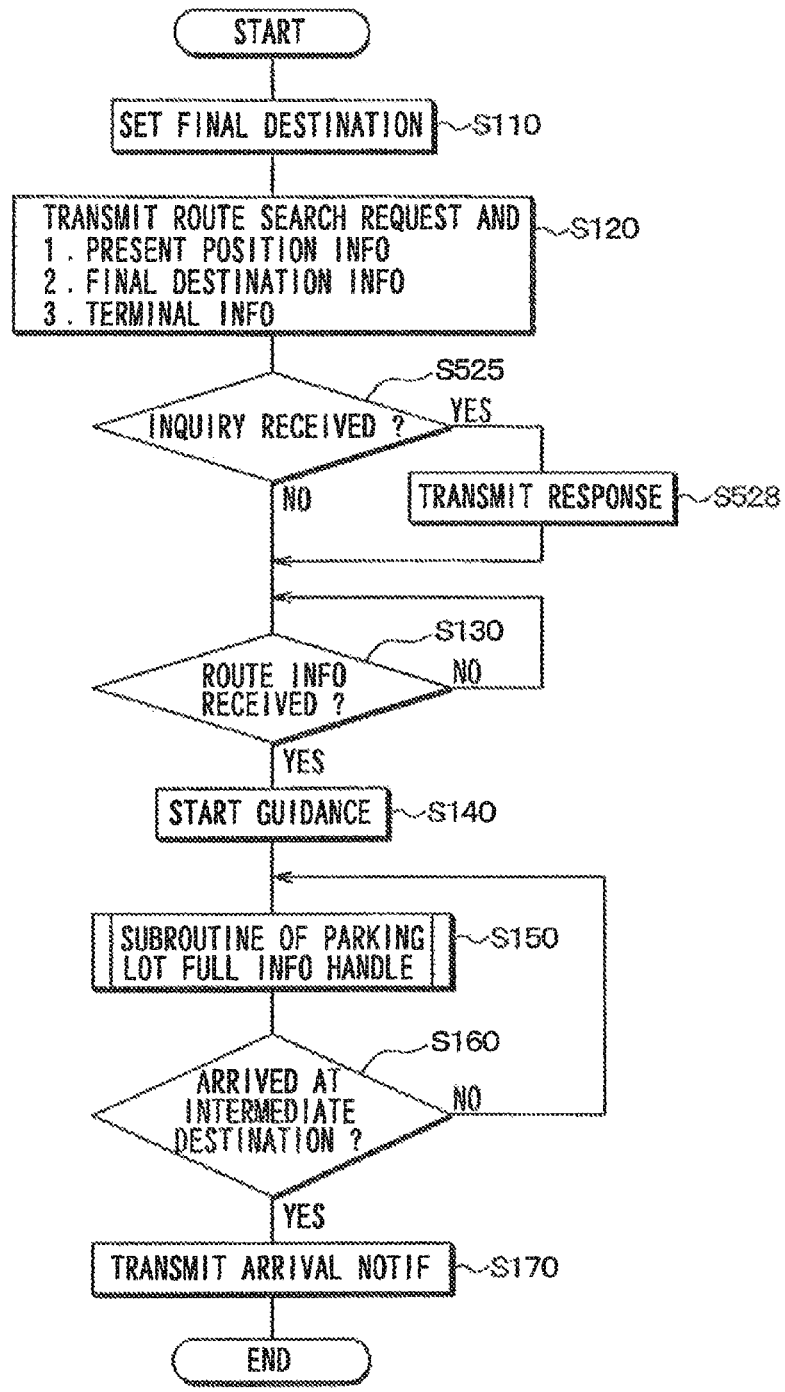
FIG. 11 is a flowchart illustrating a process executed by a terminal (the in-vehicle terminal or the mobile terminal) according to a second embodiment.
Figure 12:
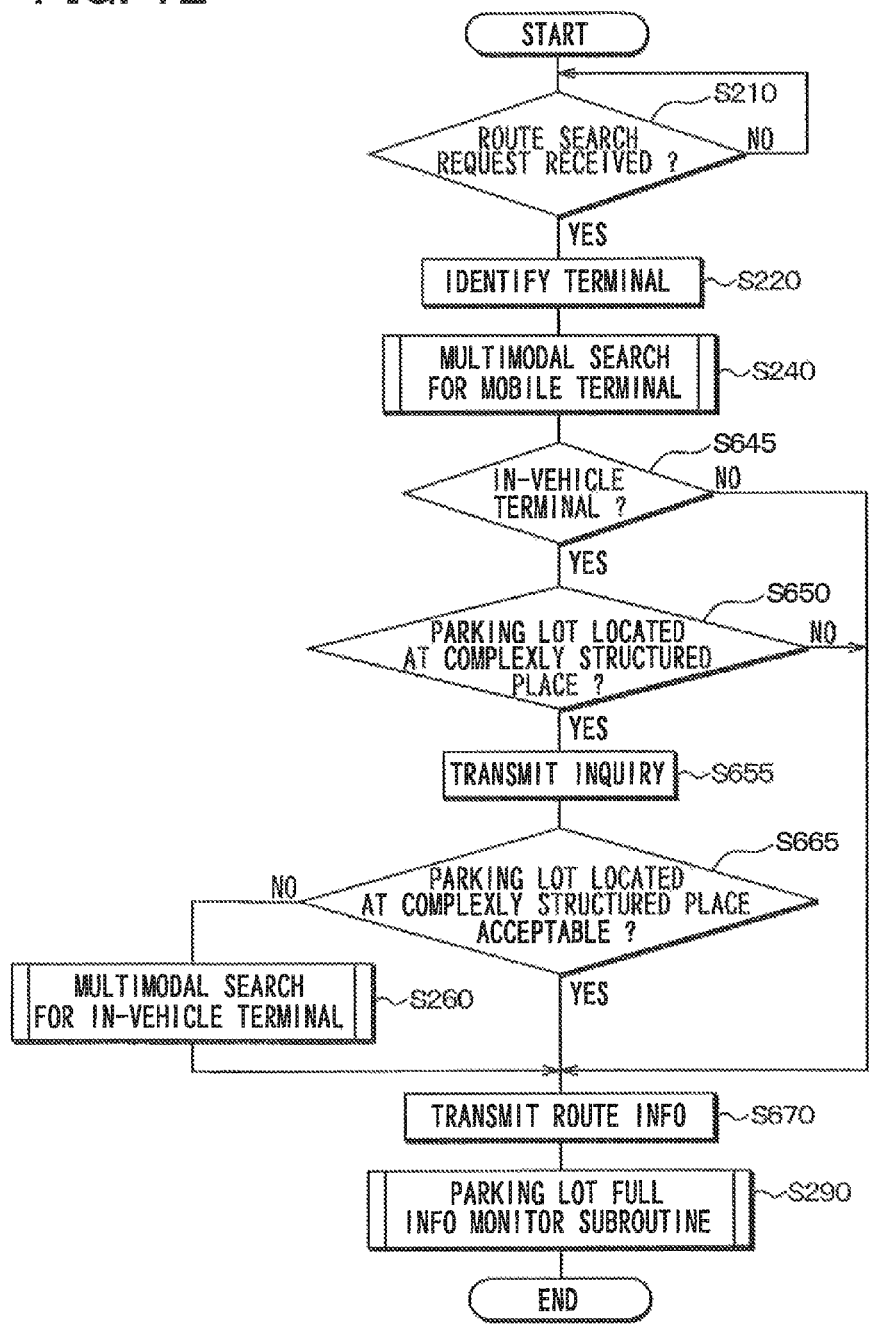
FIG. 12 is a flowchart illustrating a process executed by the information center according to the second embodiment.

In FIGS. 2 and 11, and in FIGS. 3 and 12, same reference numbers are used for equivalent steps and sections.

The following will mainly describe different operation of the navigation system of the present embodiment compared with the navigation system of the first embodiment. In the present embodiment, the in-vehicle terminal 2 or the mobile terminal 3 is also referred to as a terminal, and the control circuit 23 of the in-vehicle terminal 2 or the control circuit 33 of the mobile terminal 3 is also referred to as a terminal control circuit. As shown in FIG. 11, the terminal control circuit sets a final destination at S110, and transmits a route search request to the information center 1 at S120. As shown in FIG. 12, when receiving the route search request, the control circuit 13 of the information center 1 determines that the route search request is received (S210: "YES"), and identifies the request terminal as the in-vehicle terminal 2 or the mobile terminal 3 at S220. Then, at S240, the control circuit 13 executes the multimodal route substitute search process for the mobile terminal 3. The multimodal route substitute search process is similar to the first embodiment. Then, at S645, the control circuit 13 determines whether the request terminal of the route search request is the in-vehicle terminal 2.

When the control circuit 13 of the information center 1 determines that the request terminal of the route search request is not the in-vehicle terminal 2 (S645: "NO"), that is the request terminal of the route search request is the mobile terminal 3 the process proceeds to S670. At S670, the control circuit 13 transmits information of the route calculated at S240 to the terminal. In this case, the terminal is the mobile terminal 3. Then, at S290, the control circuit 13 executes the subroutine process of monitoring the parking lot full information, which is similar to S290 of FIG. 3.

In the terminal (the mobile terminal 3), at S525, the control circuit 33 waits to receive an inquiry request, which will be described later, from the information center 1 for a predetermined time period. When the control circuit 33 receives no inquiry request after the predetermined time period elapses (S525: "NO"), the process proceeds to S130. Then, at S130, the control circuit 33 is in a standby state until receiving the optimal route information from the information center 1. When receiving the route information from the information center 1 (S130: "YES"), the control circuit 33 starts route guidance to the user at S140. Processes after S140 are similar to the processes of the first embodiment.

When the control circuit 13 of the information center 1 determines that the request terminal of the route search request is the in-vehicle terminal 2 (S645: "YES") the process proceeds to S650. At S650, the control circuit 13 determines whether the parking lot (optimal parking lot), which is the intermediate destination, is located at a complexly structured place.

Specifically, a parking lot being located at a complexly structured place signifies a route from the parking lot to the station, which is a start point of the route B, is difficult to understand or find by a predetermined level or more. Here, the station includes a railway station, and a bus station (stop). For example, a distance along the calculated route from the parking lot to the station is defined as X, and a linear distance from the parking lot to the station is defined as Y. When a ratio X/Y is greater than a predetermined value, for example, "3", the parking lot may be determined to be located at a complexly structured place.

When the parking lot is determined to be not located at a complexly structured place (S650: "NO"), the process proceeds to S670. At S670, the control circuit 13 transmits information of the route calculated at S240 to the terminal. In this case, the terminal is the in-vehicle terminal 2. Then, at S290, the control circuit 13 executes the subroutine process of monitoring the parking lot full information, which is similar to S290 of FIG. 3.

In the terminal (the in-vehicle terminal 2), at S525, the control circuit 23 waits to receive an inquiry request from the information center 1 for a predetermined time period. When the control circuit 23 receives no inquiry request after the predetermined time period elapses (S525: "NO"), the process proceeds to S130. Then, at S130, the control circuit 23 is in a standby state until receiving the optimal route information from the information center 1. When receiving the route information from the information center 1 (S130: "YES"), the control circuit 23 starts route guidance to the user at S140. Processes after S140 are similar to the processes of the first embodiment.

When the parking lot is determined to be located at a complexly structured place (S650: "YES"), the process proceeds to S655. Then, the control circuit 13 of the information center 1 transmits an inquiry request to the terminal. The inquiry is performed in order to (i) inform the user that the parking lot selected as the intermediate destination is located at a complexly structured place, and (ii) determine whether the parking lot is acceptable to the user. In this case, the terminal is the in-vehicle terminal 2. Then, the control circuit 13 waits a response to the inquiry request.

In the in-vehicle terminal 2, when receiving the inquiry request, the control circuit 23 determines that the inquiry request is received (S525: "YES"), and the process proceeds to S528. At S528, the control circuit 23 inquires of the user about whether the parking lot located at a complexly structured place is acceptable, and receives a response indicating that the parking lot is acceptable or not acceptable from the user. When receiving the response from the user, the control circuit 23 transmits a response signal to the information center 1, and the process proceeds to S130.

In the information center 1, when receiving the response signal, the process proceeds from S655 to S665. At S665, the control circuit 13 determines whether the parking lot located at a complexly structured place is acceptable to the user according to the response signal. When determining that the parking lot located at a complexly structured place is acceptable to the user (S665: "YES"), the control circuit 13 transmits information of the route calculated at S240 to the terminal at S670. In this case the terminal is the in-vehicle terminal 2. After S670, processes executed by the information center 1 and the in-vehicle terminal 2 are similar to the processes described above.

When determining that the parking lot located at a complexly structured place is not acceptable to the user (S665: "NO"), the control circuit 13 performs the multimodal route substitute search process for the in-vehicle terminal 2 described above at S260. Then, at S670, the control circuit 13 transmits information of the route searched for at S260 to the terminal (in-vehicle terminal 2). After S670, processes executed by the information center 1 and the in-vehicle terminal 2 are similar to the processes described above.

The above-described configuration provides advantages similar to the first embodiment. Further, when (i) the request terminal of the route search request is the in-vehicle terminal 2, and (ii) the parking lot, which is searched for, is located at a complexly structured place, the information center 1 inquires of the user about whether the parking lot is acceptable instead of immediately performing the multimodal route substitute search process for the in-vehicle terminal 2. When the parking lot is not acceptable to the user, the information center 1 performs the multimodal route substitute search process for the in-vehicle terminal 2. Thus, a parking lot can be selected according to a decision of the user.

The information center 1 is configured to select a parking so that the user walks to the station after parking the vehicle. In a case where the display terminal of the optimal route is the in-vehicle terminal 2, the information center 1 selects a parking lot according to a predetermined manipulation of the user, even when a station of the public transportation, which is searched for by the information center 1, faces a main road. Under this configuration, an optimal route for using the station is determined by the manipulation of the user. Thus, route search is more likely to be applied to a user, who is familiar with an area.

[Third Embodiment]

A route calculation apparatus according to a third embodiment of the present disclosure will be described. In the present embodiment, the control circuit 13 of the information center 1, which corresponds to the route calculation apparatus, executes the multimodal route substitute search process (S260 shown in FIGS. 3 and 12) for the in-vehicle terminal 2 in a different manner.

Figure 13:
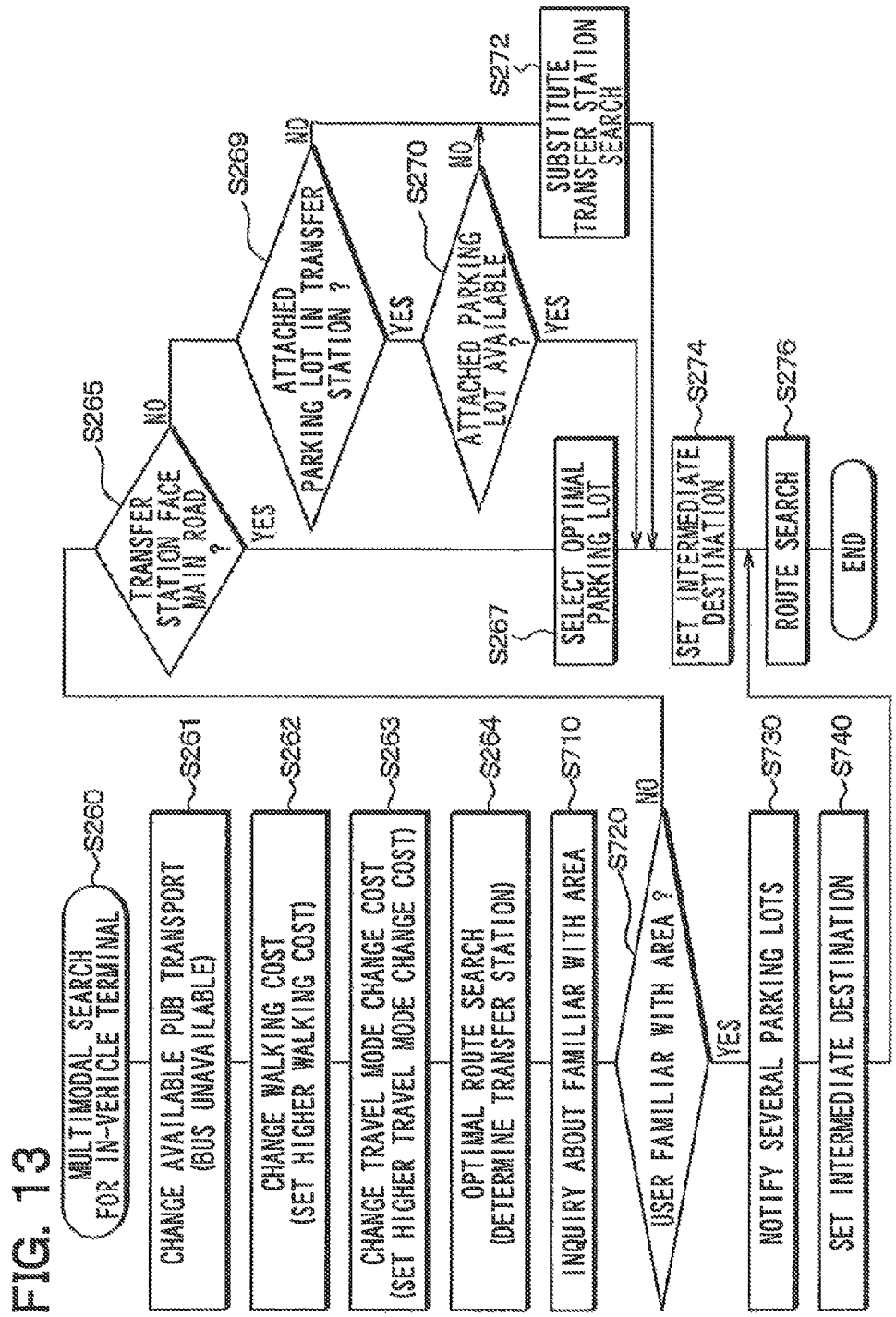
FIG. 13 is a flowchart illustrating a multimodal route substitute search process for the in-vehicle terminal according to a third embodiment.

FIG. 13 shows a flowchart of the multimodal route substitute search process for the in-vehicle terminal 2 according to the present embodiment. In FIGS. 8 and 13, same reference numbers are used for equivalent steps and sections.

In the multimodal route substitute search process for the in-vehicle terminal. 2 according to the present embodiment, the control circuit 13 executes S261 to S264, which are similar to the first embodiment. Then, at S710, the control circuit 13 inquires of the user of the in-vehicle terminal 2 whether the user is familiar with the area near the transfer station, which is selected at S264 as the start point of the route B. The control circuit 13 performs the inquiry by transmitting an inquiry signal to the in-vehicle terminal 2 in order to inquire whether the user is familiar with the area near the transfer station. The inquiry signal includes location information of the transfer station, name information of the transfer station, and an inquiry question to the user.

When receiving the inquiry signal, the control circuit 23 of the in-vehicle terminal 2 displays the location information, name information and the inquiry question to the user. The inquiry question inquires of the user whether the user is familiar with the area near the transfer station. When the user inputs an answer to the inquiry question, the control circuit 23 transmits a response signal, which indicates the user is familiar or not familiar with the area, to the information center 1. Then, at S720, the control circuit 13 of the information center 1 determines whether the response signal received from the in-vehicle terminal 2 indicates the user is familiar with the area, or indicates the user is not familiar with the area. In a case where the control circuit 13 determines that the user is not familiar with the area (S720: "NO") the process proceeds to S265. After S265, processes are executed to calculate an optimal route in a similar way to the first embodiment.

In a case where the control circuit 13 of the information center 1 determines that the user is familiar with the area (S720: "YES"), the process proceeds to S730. In this case, since the user is familiar with the area near the transfer station, it is more likely that the user has no difficulty in finding a complicated walking route from a parking lot to the transfer station. Thus, at S730, the control circuit 13 selects several parking lots around the transfer station, and transmits information about the several parking lots, such as location information, to the in-vehicle terminal 2. The parking lots may be selected according to a distance (linear distance) from each parking lot to the transfer station, or may be selected according to a parking fee of each parking lot. Specifically, the predetermined number of parking lots may be selected in increasing order of a distance (linear distance) from each parking lot to the transfer station; or the predetermined number of parking lots may be selected among several parking lots, which are apart from the transfer station at a predetermined distance (linear distance) or less, in increasing order of a parking fee of each parking lot.

When receiving information of the parking lots selected at S730, the control circuit 23 of the in-vehicle terminal 2 displays the information of the parking lots selected at S730, such as location information, to the user. The user is required to select one parking lot among the several parking lots. When the user selects one parking lot and inputs the parking lot to the in-vehicle terminal 2, the control circuit 23 transmits a selection signal indicating a parking lot selected by the user to the information center 1. In the information center 1, the control circuit 13 sets the parking lot (optimal parking lot) selected by the user as the intermediate destination at S740.

At S276, similar to the first embodiment, the control circuit 13 calculates a route A1, which includes a driving route from the present position to the optimal parking lot selected by the user, and a walking route from the optimal parking lot to the transfer station. Then, an optimal route A1+B is calculated.

Under above-described configuration, in a case where the request terminal of the route search request is the in-vehicle terminal 2, when the user is familiar with the area near the transfer station, a parking lot selected by the user is set to the optimal parking lot. Thus, a parking lot, which does not face a main road, may be selected as the optimal parking lot according to a selection of the user. Accordingly, a parking lot can be selected according to a decision of the user and familiarity level of the user to the area near the transfer station.

The information center 1 is configured to select a parking lot so that the user walks to the station after parking the vehicle. In a case where the display terminal of the optimal route is the in-vehicle terminal 2, the information center 1 selects a parking lot according to a predetermined manipulation of the user, even when a station of the public transportation, which is searched for by the information center 1, faces a main road. Under this configuration, an optimal route for using the station is determined by the manipulation of the user. Thus, route search is more likely to be applied to a user, who is familiar with an area near a station.

[Fourth Embodiment]

Figure 14:
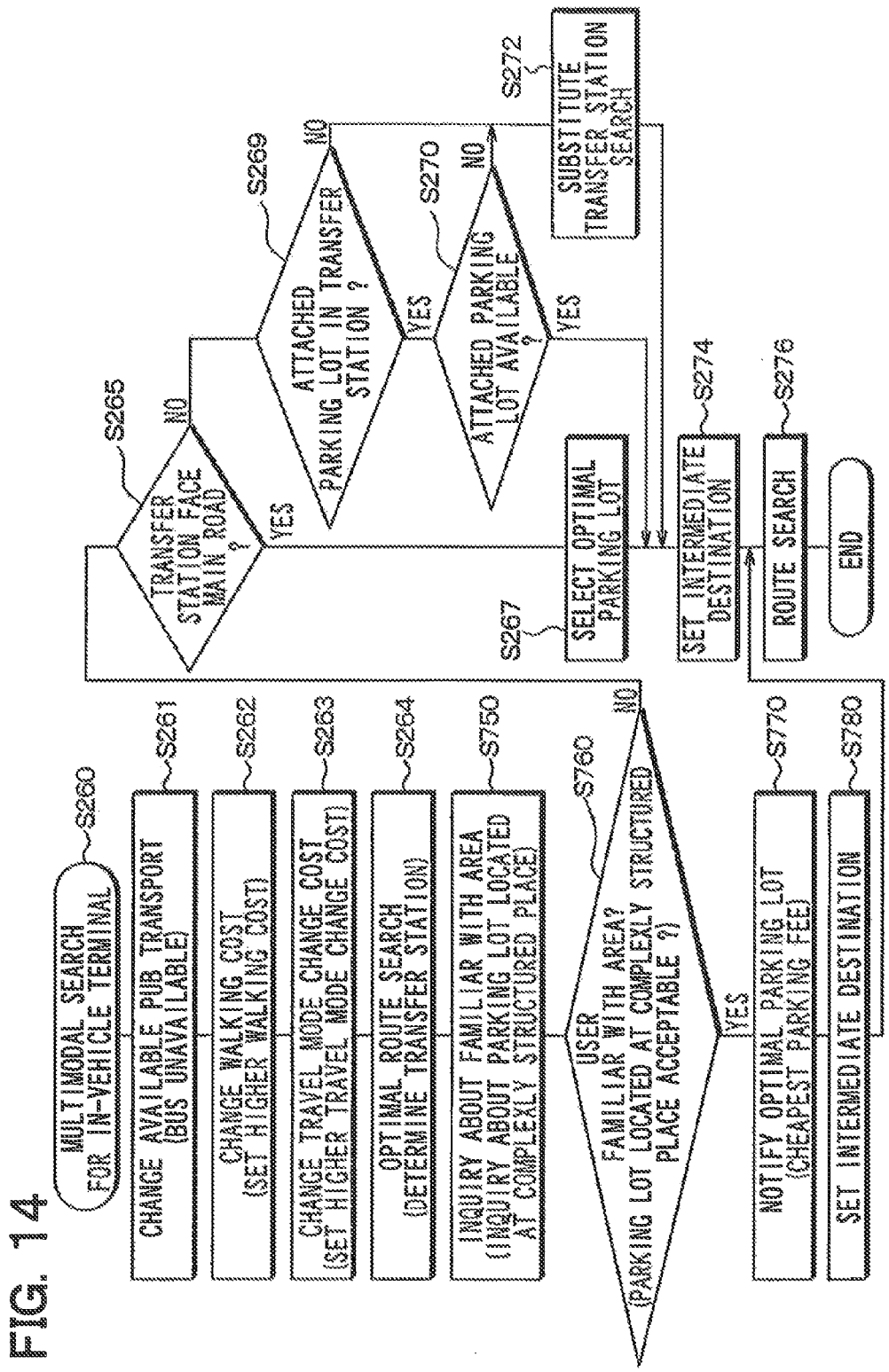
FIG. 14 is a flowchart illustrating a multimodal route substitute search process for the in-vehicle terminal according to a fourth embodiment.

A route calculation apparatus according to a fourth embodiment of the present disclosure will be described. In the present embodiment, the control circuit 13 of the information center 1, which corresponds to the route calculation apparatus, executes the multimodal route substitute search process (shown in FIG. 14) for the in-vehicle terminal 2 in a different manner compared with the multimodal route substitute search process (shown in FIG. 13) described in the third embodiment. Specifically, multimodal route substitute search process, S750, S760, S770, and S780 are executed instead of S710, S720, S730, and S740, which are executed in the third embodiment. The following will mainly describe about differences of the multimodal route substitute search process.

At S750, the control circuit 13 of the information center 1 inquires of the user of the in-vehicle terminal 2 whether the user is familiar with the area near the transfer station, which is selected at S264 as the start point of the route B. More specifically, the information center 1 may inquire of the user whether a parking lot located at a complexly structured place is acceptable. The control circuit 13 performs the inquiry by transmitting an inquiry signal to the in-vehicle terminal 2 in order to inquire whether a parking lot located at a complexly structured place is acceptable to the user. The inquiry signal includes location information of the transfer station, name information of the transfer station, and an inquiry question to the user.

When receiving the inquiry signal, the control circuit 23 of the in-vehicle terminal 2 displays the location information, name information and the inquiry question to the user. The inquiry question inquires of the user whether a parking lot located at a complexly structured place is acceptable. When the user inputs an answer to the inquiry question, the control circuit 23 transmits a response signal, which indicates the parking lot is acceptable to the user, to the information center 1. Then, at S760, the control circuit 13 of the information center 1 determines whether the response signal received from the in-vehicle terminal 2 indicates (i) that the parking lot is acceptable to the user, or (ii) that the parking lot is not acceptable to the user (i.e., an avoidance of a use of the parking lot). In a case where the control circuit 13 determines that the parking lot is not acceptable to the user (S760: "NO") the process proceeds to S265. After S265, processes are executed to calculate an optimal route in a similar way to the first embodiment.

In a case where the control circuit 13 of the information center 1 determines that the parking lot is acceptable to the user (S760: "YES"), the process proceeds to S770. In this case, since the parking lot is acceptable to the user, it is more likely that the user has no difficulty in finding the parking lot located at a complexly structured place. Thus, at S770, the control circuit 13 selects an optimal parking lot, such as a parking lot having a cheapest parking fee, among several parking lots, which are apart from the transfer station at a predetermined distance (linear distance) or less. Then, the control circuit 13 sets the selected optimal parking lot as the intermediate destination, and the process proceeds to S276. At S276, similar to the first embodiment, the control circuit 13 calculates a route A1, which includes a driving route from the present position to the selected parking lot, and a walking route from the selected parking lot to the transfer station. Then, an optimal route A1+B is calculated.

Under the above-described configuration, even in a case where the request terminal of the route search request is the in-vehicle terminal 2, when a parking lot located at a complexly structured place is acceptable to the user, such a parking lot is set to the optimal parking lot. Thus, a parking lot, which does not face a main road, may be selected as the optimal parking lot. Accordingly, a parking lot can be selected according to a decision of the user and familiarity level of the user to the area near the transfer station.

[Fifth Embodiment]

A route calculation apparatus according to a fifth embodiment of the present disclosure will be described. In the present embodiment, the control circuit 13 of the information center 1, which corresponds to the route calculation apparatus, executes processes shown in FIG. 15 instead of processes shown in FIG. 2. Accordingly, the control circuit 23 of the in-vehicle terminal 2 and the control circuit 33 of the mobile terminal 3 execute processes shown in FIG. 16 instead of processes shown in FIG. 3.

Figure 15:
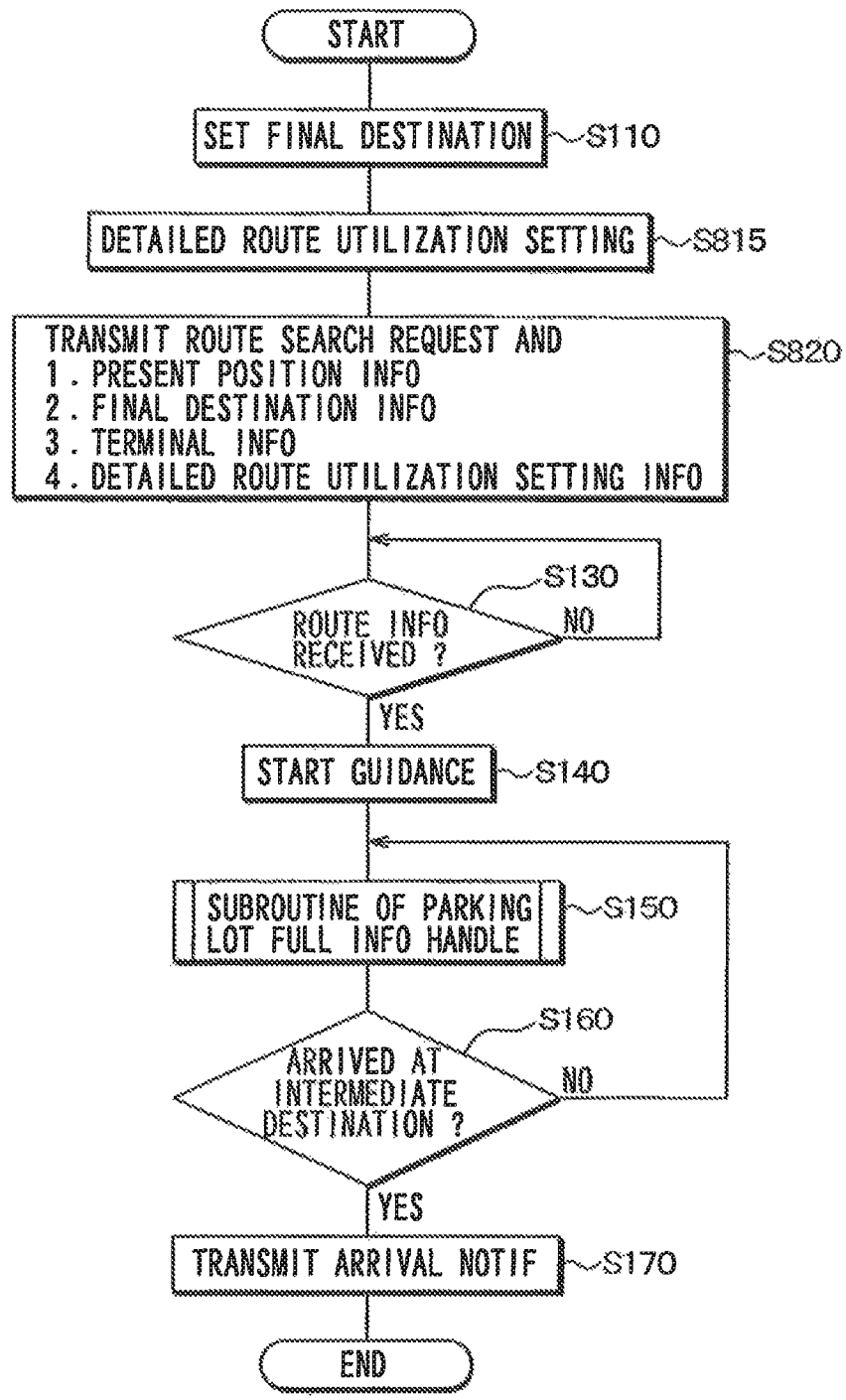
FIG. 15 is a flowchart illustrating a process executed by a terminal (in-vehicle terminal or the mobile terminal) according to a fifth embodiment.
Figure 16:
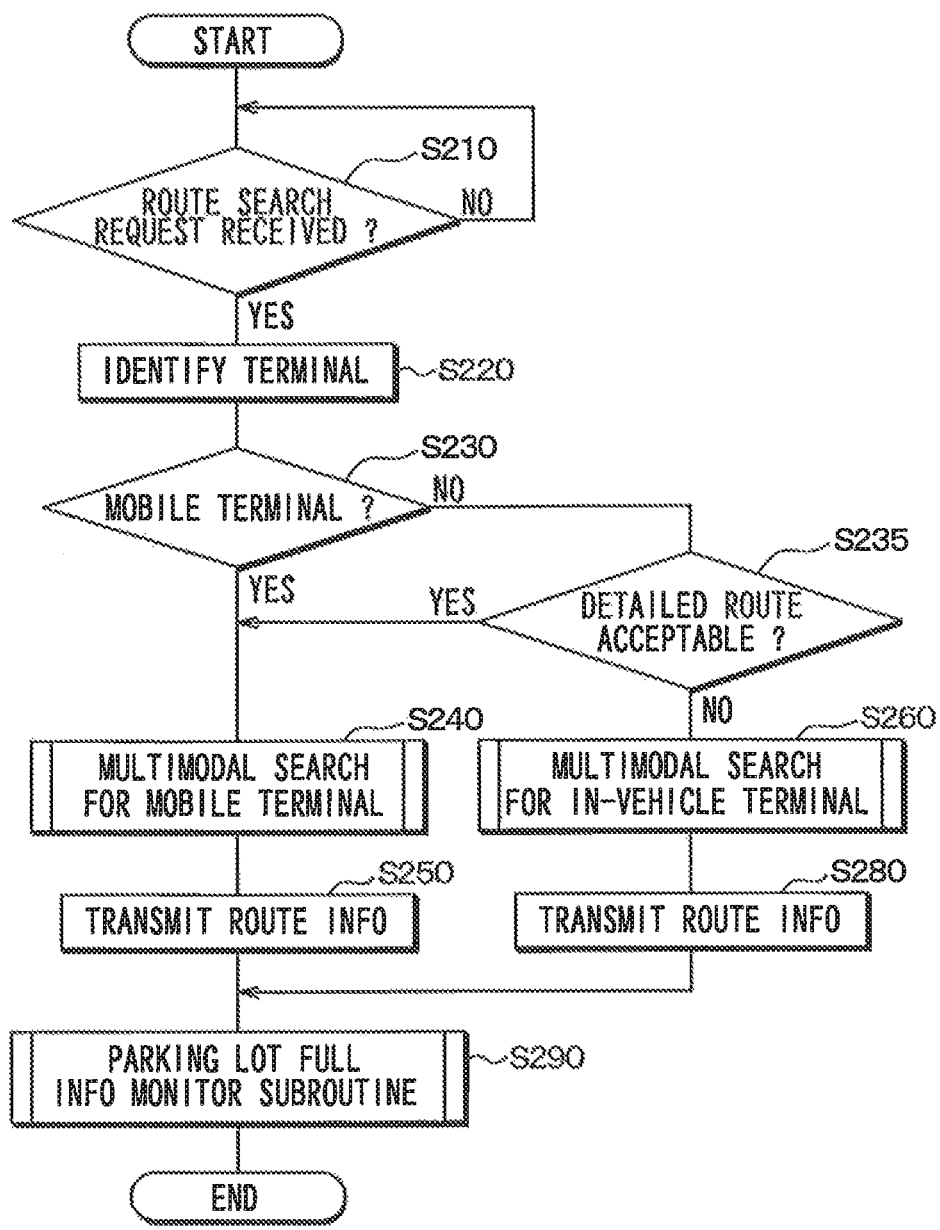
FIG. 16 is a flowchart illustrating a process executed by the information center.

In FIGS. 2 and 15, and in FIGS. 3 and 16, same reference numbers are used for equivalent steps and sections.

The following will mainly describe difference of the present embodiment compared with the navigation system of the first embodiment. In the present embodiment, the in-vehicle terminal 2 or the mobile terminal 3 is also referred to as a terminal, and the control circuit 23 of the in-vehicle terminal 2 or the control circuit 33 of the mobile terminal 3 is also referred to as a terminal control circuit. As shown in FIG. 15, the terminal control circuit sets a final destination at S110, and the process proceeds to S815 to perform a detailed route utilization setting.

The detailed route utilization setting is a process which determines whether a complicated station (the start point of the route B) of the public transportation, a complicated parking lot, and a complicated route between a station and a parking lot are utilized for the optimal route. Here, a detailed route may include above-described complicated station, complicated parking lot, and complicated route between a station and a parking lot. The user of the terminal determines whether to utilize the detailed route for the optimal route at S815 by inputting a selection to the terminal.

At S820, the terminal transmits the route search request to the information center 1. Similar to the first embodiment, the route search request includes present position information of the vehicle, final destination information, and terminal information. Further, the route search request according to the present embodiment, includes detailed route utilization setting information set at S815. The detailed route utilization setting information indicates whether the detailed route is utilized for the optimal route or not. Then, at S130, the terminal is in a standby state until receiving the optimal route information from the information center 1.

In the information center 1, the control circuit 13 receives the route search request at S210, and determines whether the request terminal of the route search request is the mobile terminal 3. When determining that the request terminal is not the mobile terminal 3 (S230: "NO"), that is the request terminal is the in-vehicle terminal 2, the control circuit 13 determines whether the detailed route is utilized for the optimal route according to the detailed route utilization setting information included in the route search request at S235. When determining that the detailed route is utilized for the optimal route (S235: "YES"), the control circuit 13 performs the multimodal route substitute search process (S240) for the mobile terminal 3 instead of performing the multimodal route substitute search process (5260) for the in-vehicle terminal 2. When determining that the detailed route is not utilized for the optimal route (S235: "NO"), the control circuit 13 performs the multimodal route substitute search process (S260) for the in-vehicle terminal 2.

Under above-described configuration, even when the display terminal of the optimal route is the in-vehicle terminal 2, multimodal route substitute search process for the mobile terminal 3 is performed according to a decision of the user.

In the above-described embodiments, S240, and S260 executed by the control circuit 13 of the information center 1 function as the route search section; S230, and S645 executed by the control circuit 13 of the information center 1 function as the terminal determination section; S272 executed by the control circuit 13 of the information center 1 functions as a substitute parking lot setting section.

[Other Embodiments]

In the fifth embodiment, when performing the detailed route utilization setting at S815 of FIG. 15, the user may be required to determine (i) whether utilization of a bus is acceptable; (ii) whether a walking route having a long distance from the parking lot to the station is acceptable; (iii) whether a travel mode change is acceptable. When the user makes a selection to the required determination, information indicative of a selection of the user is included in the detailed route utilization setting information, and is transmitted to the information center 1. Then, the control circuit 13 of the information center 1 performs the multimodal route substitute search process (S240 of FIG. 16) for the mobile terminal 3, and performs the multimodal route substitute search process (S260 of FIG. 16) for the in-vehicle terminal 2, with consideration of the selection of the user.

In the forgoing embodiments, the control circuits 13, 23, 33 achieve above-described functions by executing programs stored in a storage media. Alternatively, the control circuits 13, 23, 33 may be configured by a hardware circuit, such as a field programmable gate array (FPGA), that enables a circuit configuration by programming, in order to achieve above-described functions.

In the forgoing embodiments, the information center 1, the in-vehicle terminal 2, and the mobile terminal 3 are configured separately from each other. Alternatively, the in-vehicle terminal 2 and the information center 1 may be configured as one integrated instrument having functions of the in-vehicle terminal 2 and the information center 1. Alternatively, the mobile terminal 3 and the information center 1 may be configured as one integrated instrument having functions of the mobile terminal 3 and the information center 1.

While the present disclosure has been described with reference to preferred embodiments thereof, it is to be understood that the disclosure is not limited to the preferred embodiments and constructions. The present disclosure is intended to cover various modifications and same arrangements. In addition, while the various combinations and configurations, which are preferred, other combinations and configurations, including more, less or only a single element, are also within the spirit and scope of the present disclosure.

What is claimed is:

1. A route calculation apparatus comprising:
   a route search section that searches for and calculates an optimal route from a departure point to a destination using a public transportation and a vehicle other than a public vehicle that belongs to the public transportation; and
   a terminal determination section that determines a display terminal of the optimal route calculated by the route search section, the terminal determination section determining whether the display terminal is an in-vehicle terminal, which is non-portable from the vehicle, or a mobile terminal, which is portable from the vehicle, the in-vehicle terminal being separate from the mobile terminal,
   the route search section being further configured to calculate, from a specific departure point to a specific destination,
   (i) an optimal route for the in-vehicle terminal in a case where the terminal determination section determines that the display terminal of the optimal route is the in-vehicle terminal, and
   (ii) an optimal route for the mobile terminal in a case where the terminal determination section determines that the display terminal of the optimal route is the mobile terminal,
     the route search section is configured to separately calculate the optimal route for the in-vehicle terminal and the optimal route for the mobile terminal so that the optimal routes can be different when (i) the specific departure point of the optimal route for the in-vehicle terminal is equal to the specific departure point of the optimal route for the mobile terminal and (ii) the specific destination of the optimal route for the in-vehicle terminal is equal to the specific destination of the optimal route for the mobile terminal.

2. The route calculation apparatus according to claim 1, wherein:
   in the case where the terminal determination section determines that the display terminal of the optimal route is the in-vehicle terminal,
   the route search section limits available types of the public transportation compared with the case where the terminal determination section determines that the display terminal of the optimal route is the mobile terminal.

3. The route calculation apparatus according to claim 1, wherein:
   in the case where the terminal determination section determines the display terminal of the optimal route is the in-vehicle terminal,
   the route search section sets a reference cost for walking a unit distance higher compared with the case where the terminal determination section determines that the display terminal of the optimal route is the mobile terminal.

4. The route calculation apparatus according to claim 1, wherein:
   in the case where the terminal determination section determines the display terminal of the optimal route is the in-vehicle terminal,
   the route search section sets a reference cost for each travel mode change higher compared with the case where the terminal determination section determines that the display terminal of the optimal route is the mobile terminal.

5. The route calculation apparatus according to claim 1, wherein:
the route search section searches for, between the specific departure point and the specific destination,
(i) a public transportation station for the in-vehicle terminal in the case where the terminal determination section determines that the display terminal of the optimal route is the in-vehicle terminal, and
(ii) a public transportation station for the mobile terminal in the case where the terminal determination section determines that the display terminal of the optimal route is the mobile terminal,
a location of the public transportation station for the in-vehicle terminal being different from a location of the public transportation station for the mobile terminal.

6. The route calculation apparatus according to claim 1, wherein:
the route search section searches for a parking lot between a departure point and a destination, so that a user of the vehicle parks the vehicle at the parking lot and then walks to a public transportation station; and
the route search section searches for, between the specific departure point and the specific destination,
(i) a parking lot for the in-vehicle terminal in the case where the terminal determination section determines that the display terminal of the optimal route is the in-vehicle terminal, and
(ii) a parking lot for the mobile terminal in the case where the terminal determination section determines that the display terminal of the optimal route is the mobile terminal,
the parking lot for the in-vehicle terminal being different from the parking lot for the mobile terminal.

7. The route calculation apparatus according to claim 1, wherein:
the route search section searches for the public transportation station in the optimal route in the case where the terminal determination section determines that the display terminal of the optimal route is the in-vehicle terminal, so that a user of the vehicle parks the vehicle at a parking lot and then walks to the public transportation station;
the route search section determines whether the public transportation station faces a predetermined main road;
when the route search section determines that the public transportation station faces the predetermined main road, the route search section searches for the parking lot so that the user walks to the public transportation station after parking the vehicle; and
when the route search section determines that the public transportation station does not face the predetermined main road, the route search section searches for a substitute public transportation station.

8. The route calculation apparatus according to claim 1, wherein:
the route search section searches for the public transportation station in the optimal route in the case where the terminal determination section determines that the display terminal of the optimal route is the in-vehicle terminal so that a user of the vehicle parks the vehicle at a parking lot and then walks to the public transportation station;
the route search section determines whether the public transportation station faces a predetermined main road;
the route search section further determines whether the public transportation station has an attached parking lot when the route search section determines that the public transportation station does not face the predetermined main road;
when the route search section determines that the public transportation station has the attached parking lot, the route search section selects the attached parking lot as the parking lot; and
when the route search section determines that the public transportation station does not have the attached parking lot, the route search section searches for a substitute public transportation station.

9. The route calculation apparatus according to claim 8, wherein:
the route search section selects the parking lot according to a selection of the user of the vehicle, regardless of whether the route search section determines that the public transportation station does not face the predetermined main road, even in the case where the terminal determination section determines that the display terminal of the optimal route is the in-vehicle terminal.

10. The route calculation apparatus according to claim 1, wherein:
the route search section searches for a parking lot during traveling an optimal route calculated by the route search section, so that a user of the vehicle parks the vehicle at the parking lot and then walks to a public transportation station;
the route search section determines whether the parking lot is full during traveling the optimal route; and
when the route search section determines that the parking lot is full, the route search section sets a substitute parking lot during traveling the optimal route.

11. The route calculation apparatus according to claim 1, wherein:
in the case where the terminal determination section determines that the display terminal of the optimal route is the in-vehicle terminal,
the route search section limits available types of the public transportation to those which have parking, compared with the case where the terminal determination section determines that the display terminal of the optimal route is the mobile terminal.

12. The route calculation apparatus according to claim 1, wherein:
in the case where the terminal determination section determines that the display terminal of the optimal route is the in-vehicle terminal,
the route search section limits available types of the public transportation including trains and buses compared with the case where the terminal determination section determines that the display terminal of the optimal route is the mobile terminal.

13. The route calculation apparatus according to claim 1, wherein:
in the case where the terminal determination section determines that the display terminal of the optimal route is the in-vehicle terminal,
the route search section limits available types of the public transportation by limiting a station of the public transportation compared with the case where the terminal determination section determines that the display terminal of the optimal route is the mobile terminal.

14. The route calculation apparatus according to claim 1, wherein:

in the case where the terminal determination section determines that the display terminal of the optimal route is the in-vehicle terminal, the route search section sets a first reference cost for walking a unit distance and a first reference cost for each travel mode change for calculating a route cost;

in the case where the terminal determination section determines that the display terminal of the optimal route is the mobile terminal, the route search section sets a second reference cost for walking the unit distance and a second reference cost for each travel mode change for calculating the route cost;

the first reference cost for walking the unit distance is higher than the second reference cost for walking the unit distance, and the first reference cost for each travel mode change is higher than the second reference cost for each travel mode change;

each route searched by the route search section has a route cost that includes a sum of the reference cost for walking the unit distance and the reference cost for each travel mode change; and the route search section sets a route having a minimum route cost as the optimal route.

15. A route calculation apparatus comprising:
a control circuit; and
a storage media,
the control circuit is configured to
search, by a route search section, in the storage media, for and calculates an optimal route from a departure point to a destination using a public transportation and a vehicle other than a public vehicle that belongs to the public transportation; and determine, by a terminal determination section, a display terminal of the optimal route calculated by the route search section, the terminal determination section determining whether the display terminal is an in-vehicle terminal, which is non-portable from the vehicle, or a mobile terminal, which is portable from the vehicle, the in-vehicle terminal being separated from the mobile terminal, the route search section being further configured to calculate, from a specific departure point to a specific destination,
  (i) an optimal route for the in-vehicle terminal in a case where the terminal determination section determines that the display terminal of the optimal route is the in-vehicle terminal, and
  (ii) an optimal route for the mobile terminal in a case where the terminal determination section determines that the display terminal of the optimal route is the mobile terminal,
    the route search section is configured to separately calculate the optimal route for the in-vehicle terminal and the optimal route for the mobile terminal so that the optimal routes can be different when (i) the specific departure point of the optimal route for the in-vehicle terminal is equal to the specific departure point of the optimal route for the mobile terminal and (ii) the specific destination of the optimal route for the in-vehicle terminal is equal to the specific destination of the optimal route for the mobile terminal.

16. The route calculation apparatus according to claim 15, wherein:
in the case where the terminal determination section determines that the display terminal of the optimal route is the in-vehicle terminal,
the route search section limits available types of the public transportation compared with the case where the terminal determination section determines that the display terminal of the optimal route is the mobile terminal.

17. The route calculation apparatus according to claim 15, wherein:
in the case where the terminal determination section determines the display terminal of the optimal route is the in-vehicle terminal,
the route search section sets a reference cost for walking a unit distance higher compared with the case where the terminal determination section determines that the display terminal of the optimal route is the mobile terminal.

* * * * *